(12) United States Patent
Hirai et al.

(10) Patent No.: US 11,410,300 B2
(45) Date of Patent: Aug. 9, 2022

(54) DEFECT INSPECTION DEVICE, DEFECT INSPECTION METHOD, AND STORAGE MEDIUM

(71) Applicant: Kabushiki Kaisha Toshiba, Minato-ku (JP)

(72) Inventors: Ryusuke Hirai, Setagaya (JP); Kyoka Sugiura, Kawasaki (JP); Yukinobu Sakata, Kawasaki (JP); Akiyuki Tanizawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 232 days.

(21) Appl. No.: 16/802,274

(22) Filed: Feb. 26, 2020

(65) Prior Publication Data

US 2021/0065344 A1 Mar. 4, 2021

(30) Foreign Application Priority Data

Sep. 2, 2019 (JP) .............................. JP2019-159396

(51) Int. Cl.
*G06T 7/00* (2017.01)
(52) U.S. Cl.
CPC .... *G06T 7/001* (2013.01); *G06T 2207/10061* (2013.01); *G06T 2207/10116* (2013.01); *G06T 2207/30148* (2013.01)
(58) Field of Classification Search
CPC ........... G06T 7/001; G06T 2207/10061; G06T 2207/10116; G06T 2207/30148
See application file for complete search history.

(56) References Cited

U.S. PATENT DOCUMENTS

| 10,460,435 B2 * | 10/2019 | Inoue ...................... G06T 7/001 |
| 2007/0064994 A1 * | 3/2007 | Oaki ....................... G06T 7/001 |
| | | 382/144 |
| 2007/0237385 A1 * | 10/2007 | Kato ................... G01N 21/9501 |
| | | 382/149 |

(Continued)

FOREIGN PATENT DOCUMENTS

| JP | H10119250 A | * | 5/1998 |
| JP | 6195253 B2 | | 9/2017 |

*Primary Examiner* — Carol Wang
(74) *Attorney, Agent, or Firm* — Oblon, McClelland, Maier & Neustadt, L.L.P.

(57) ABSTRACT

A defect inspection device includes at least one memory storing instructions and at least one processor. The at least one processor is configured to execute the instructions to acquire a first image of an inspection target created in a first creation method, acquire a second image obtained by photographing the inspection target, extract index data similar to the acquired first image with reference to a database, the index data being a third image created in the first creation method or a feature quantity obtained by the third image, the database including the index data associated with correct data that is used as a comparison target of the index data and is an image determined not to be defective in previous inspection, acquire the correct data associated with the extracted index data in the database, generate a reference image on the basis of the acquired correct data, and estimate a pixel associated with a defective position on the inspection target photographed in the second image by comparing the reference image with the second image.

15 Claims, 12 Drawing Sheets

(56) References Cited

U.S. PATENT DOCUMENTS

2016/0042505 A1* 2/2016 Tsuchiya ................. G06T 7/001
                                                          382/144
2018/0101941 A1* 4/2018 Matsumoto ............... G03F 1/36

* cited by examiner

DEFECT INSPECTION DEVICE, DEFECT INSPECTION METHOD, AND STORAGE MEDIUM

CROSS-REFERENCE TO RELATED APPLICATION

This application is based upon and claims the benefit of priority from Japanese Patent Application No. 2019-159396, filed on Sep. 2, 2019; the entire contents of which are incorporated herein by reference.

FIELD

Embodiments described herein relate generally to a defect inspection device, a defect inspection method, and a storage medium.

BACKGROUND

In a situation in which a semiconductor device such as a large scale integrated circuit (LSI) is manufactured, it is important to inspect that no defect is included in an original mask when a circuit pattern of the semiconductor device is formed to minimize a decrease in the yield of semiconductor devices to be manufactured. Conventionally, as one of inspection methods of inspecting a defect included in a mask, there is an inspection method called die-to-database inspection (hereinafter referred to as "DB inspection") in which a captured image obtained by photographing a circuit pattern formed on a created mask is compared with a reference image obtained by virtually generating a captured image on the basis of a circuit pattern of design data of the mask. In the DB inspection, a portion in which a large difference between the captured image and the reference image is detected as a defect included in the mask. Due to this simple principle, the DB inspection is adopted in various mask inspection devices.

An crucial task of the DB inspection is to generate a reference image with high accuracy reproduction of a captured image of a mask by using mask design data. If the reproducibility of the reference image is low, the possibility of miss detection of a defect increases.

In this regard, technology related to a method of generating a reference image has been disclosed. For example, technology for generating a reference image reflecting a blur of a boundary portion (a so-called edge portion) of a circuit pattern caused by optical characteristics of an imaging system for creating a binarized image representing the presence/absence of a circuit pattern on the basis of design data of a mask and obtaining a captured image by photographing an actual mask in the binarized image is known. In this technology, the reference image is generated by convolution of a point spread function (PSF) obtained from an edge portion of the photographed circuit pattern in the captured image with the binarized image. The PSF is obtained by calculating a sigmoid function obtained by approximating the blur of the edge portion of the circuit pattern on the basis of the captured image and differentiating the sigmoid function. In other words, in this technology, an optical blur included in the captured image is reproduced by a convolution operation that is a linear operation.

DETAILED DESCRIPTION

In recent years, refinement of a process of manufacturing a semiconductor device has been performed. Thus, in a method of reproducing an optical blur according to a convolution operation, for example, when a convolution window for performing a convolution operation includes a plurality of edge portions of a circuit pattern, it is difficult to reproduce an optical blur of the edge portion. Then, the probability of erroneous detection of the defect is increased in the defect inspection of the mask. According to the embodiments, a defect inspection device, a defect inspection method, and a storage medium capable of performing defect inspection with high accuracy are provided.

According to an embodiment, a defect inspection device includes at least one memory storing instructions and at least one processor. The at least one processor is configured to execute the instructions to acquire a first image of an inspection target created in a first creation method, acquire a second image obtained by photographing the inspection target, extract index data similar to the acquired first image with reference to a database, the index data being a third image created in the first creation method or a feature quantity obtained by the third image, the database including the index data associated with correct data that is used as a comparison target of the index data and is an image determined not to be defective in previous inspection, acquire the correct data associated with the extracted index data in the database, generates a reference image on the basis of the acquired correct data, and estimate a pixel associated with a defective position on the inspection target photographed in the second image by comparing the reference image with the second image.

Hereinafter, a defect inspection device, a defect inspection method, and a storage medium according to embodiments will be described with reference to the drawings. In the following description, an example in which the defect inspection device is adopted in a mask defect inspection system for inspecting whether or not a defect has been incorporated into a mask after creation of an original mask on which a circuit pattern of a semiconductor device is formed for use in manufacturing of a semiconductor device such as an LSI will be described.

First Embodiment

Figure 1:
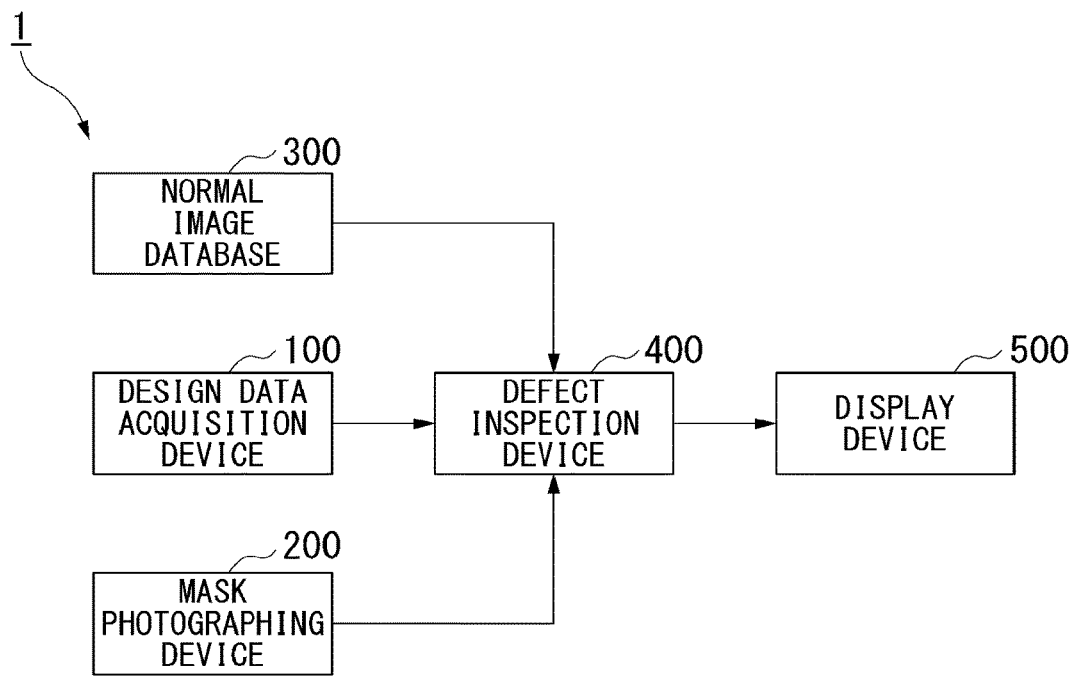
FIG. 1 is a block diagram showing an example of a configuration of a mask defect inspection system including a defect inspection device according to a first embodiment.

FIG. 1 is a block diagram showing an example of a configuration of a mask defect inspection system including a defect inspection device according to a first embodiment. The mask defect inspection system 1 includes, for example, a design data acquisition device 100, a mask photographing device 200, a normal image database 300, a defect inspection device 400, and a display device 500.

The design data acquisition device 100 acquires design data of an inspection target mask and creates a first image on the basis of the acquired design data. The mask design data is, for example, data (a graphic image) created using a computer dedicated to design such as computer aided design (CAD). In mask design, design data for mask creation for forming a circuit pattern for implementing a semiconductor device is created through processes such as functional design for implementing functions required for semiconductor devices, logic design for creating circuit diagrams, and physical design for arranging circuit elements and wiring layouts. The first image is a design image created by performing a predetermined process on the design data for creating a mask. For example, the first image is an image that does not have any optical blur. The first image may be a two-dimensional binarized image in which the presence/absence of a circuit pattern is represented by a binary value as in an image created in conventional die-to-database inspection (DB inspection). In the present embodiment, a predetermined processing method of creating the first image on the basis of the design data for creating a mask is not particularly limited. The design data acquisition device 100 outputs the created first image to the defect inspection device 400. The "predetermined processing method of creating the first image on the basis of the design data" is an example of a "first creation method" in the claims.

The mask photographing device 200 photographs an inspection target mask that is actually created from design data for mask creation (on which a circuit pattern is formed). The inspection target mask is created, for example, by exposing the circuit pattern with an electron beam exposure device or the like. For example, the mask photographing device 200 is an optical photographing device having a principle similar to that of a general electron microscope or X-ray photographing. The mask photographing device 200 includes a light source that radiates light such as electromagnetic waves to scan the entire mask or a part of the mask, and a sensor that allows exposure with light such as electromagnetic waves transmitted through the mask or reflected by the mask. The light source is, for example, a deep ultraviolet (DUV) laser. Also, pixels are arranged in a two-dimensional array in the sensor as in a complementary metal oxide semiconductor (CMOS) sensor and the like. Alternatively, a line sensor in which light sources and sensors are arranged in a one-dimensional line may be used. The sensor images the circuit pattern formed on the mask with a pixel value corresponding to an intensity of exposure light (electromagnetic waves) by allowing exposure with light (electromagnetic wave) incident on each pixel. In the mask photographing device 200, a wavelength of light radiated by the light source and the arrangement and number of pixels arranged in an array in the sensor are appropriately determined in accordance with the fineness of the circuit pattern formed on the inspection target mask. An image captured (imaged) by the mask photographing device 200 (hereinafter referred to as a mask-photographed image) includes an optical blur at the time of photographing in an edge portion of the circuit pattern. The mask photographing device 200 outputs the captured mask-photographed image to the defect inspection device 400 as a second image.

The normal image database 300 is a database in which a design image determined not to be defective in previous mask defect inspection and a mask-photographed image are associated and registered. The design image is an example of a "third image" and is an example of "index data" and the mask-photographed image is an example of "correct data". For example, the normal image database 300 is a database in which a design image created on the basis of design data of another semiconductor device previously subjected to mask defect inspection in the mask defect inspection system 1 and a mask-photographed image determined not to be defective to be used as a comparison target with the design image are associated and registered as a set of images. The set of images registered in the normal image database 300 may be classified (categorized) on the basis of information of a design pattern of another semiconductor device and information about capturing of a mask-photographed image obtained by photographing a mask actually created from the design data of this semiconductor device. The information of the design pattern is, for example, information about minimum geometrical processing dimensions such as a minimum wiring width, a straight line length, and curvature of a curve when a circuit is formed defined as standards for each semiconductor device manufacturing process or information about a type of circuit implemented in the semiconductor device such as whether the circuit is an analog circuit such as an RF circuit or a digital circuit such as a logical operation circuit. The information about the capturing of the mask-photographed image is, for example, information such as a photographing condition such as a magnification when the mask is photographed by the mask photographing device 200 and resolution of the mask-photographed image. Although it is only necessary for the design image and the mask-photographed image of the set of images registered in the normal image database 300 to have the same resolution, they may be images converted to have the same resolution.

Instead of the above, the "index data" may be, for example, data based on a feature quantity of a circuit pattern obtained from a design image. The feature quantity can represent the feature of the circuit pattern instead of the image, such as a distance or direction from a predetermined base point to the wiring.

In the following description, a design image registered in the normal image database 300 as a part of a set of images or a feature quantity of a circuit pattern obtained from the design image is referred to as "index data" and the mask-photographed image registered in the normal image database 300 as a part of a set of images is referred to as "correct data".

The defect inspection device 400 estimates the defect in the circuit pattern copied in the second image output by the mask photographing device 200, i.e., the defect in the circuit pattern formed on the actually created mask. When the defect in the circuit pattern is estimated, the defect inspection device 400 extracts index data similar to the first image output by the design data acquisition device 100 from index data included in sets of images registered in the normal image database 300. Then, the defect inspection device 400 generates a simulated image obtained by reproducing a second image (a mask-photographed image) output by the mask photographing device 200 from the first image in a pseudo manner as a reference image on the basis of the correct data associated with the extracted index data. Thereafter, the defect inspection device 400 compares the generated reference image with the second image actually captured and output by the mask photographing device 200 and estimates a defect that is likely to be present in the circuit pattern formed on the actual mask. The defect inspection device 400 outputs information indicating a position where there is a defect in the estimated circuit pattern to the display device 500 and causes the display device 500 to display the information. Details related to the configuration and process of the defect inspection device 400 will be described below.

Figure 2:
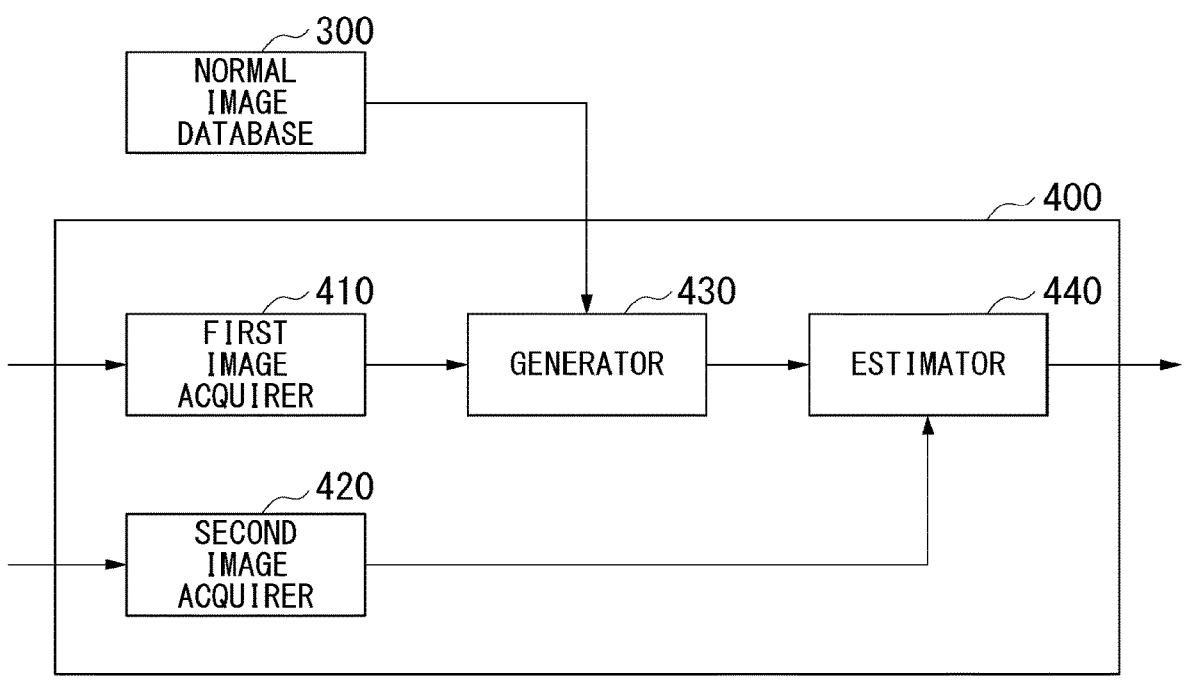
FIG. 2 is a block diagram showing an example of a configuration of the defect inspection device according to the first embodiment.

The display device 500 displays an image corresponding to information indicating a position where there is a defect in the circuit pattern output by the defect inspection device 400. The display device 500 is, for example, a liquid crystal display (LCD) or an organic electroluminescence (EL) display device. When the circuit pattern is not defective, the display device 500 displays a message for notifying that there is no defect in the circuit pattern in accordance with the information output by the defect inspection device 400. The display device 500 may be configured as a touch panel. Hereinafter, a configuration of the defect inspection device 400 according to the first embodiment will be described. FIG. 2 is a block diagram showing an example of the configuration of the defect inspection device 400 according to the first embodiment. The defect inspection device 400 includes a first image acquirer 410, a second image acquirer 420, a generator 430, and an estimator 440. In the following description, it is assumed that the index data is a design image and the correct data is a mask-photographed image.

For example, some or all of functions of the constituent elements of the defect inspection device 400 are implemented, for example, by a hardware processor such as a central processing unit (CPU) executing a program (software). Some or all of these constituent elements are implemented, for example, by hardware (a circuit including circuitry) such as a large scale integration circuit (LSI), an application specific integrated circuit (ASIC), a field-programmable gate array (FPGA), or a graphics processing unit (GPU) or may be implemented by cooperation between software and hardware. Also, some or all of the constituent elements may be implemented by a dedicated LSI. The program (software) may be pre-stored in a storage device such as a hard disk drive (HDD) or a flash memory (a storage device including a non-transitory storage medium) or pre-stored in a removable storage medium such as a DVD or a CD-ROM (a non-transitory storage medium). The program may be installed in the storage device when the storage medium is mounted in a drive device. Also, the program (software) may be pre-downloaded from another computer device via a network and installed in the storage device.

The first image acquirer 410 acquires the first image output by the design data acquisition device 100. The first image acquirer 410 outputs the acquired first image to the generator 430.

The second image acquirer 420 acquires the second image output by the mask photographing device 200. The second image acquirer 420 outputs the acquired second image to the estimator 440.

Also, the second image acquirer 420 may be configured to output the second image output by the mask photographing device 200 to the estimator 440 after image processing such as defective pixel correction is performed so as to distinguish a circuit pattern defect and a defect originally included in the second image (for example, a defect in a pixel originally included in a sensor constituting the mask photographing device 200). However, when the mask photographing device 200 outputs the second image subjected to image processing such as defective pixel correction, the second image acquirer 420 may output the acquired second image to the estimator 440 without performing image processing such as defective pixel correction. Because image processing such as defective pixel correction in the second image acquirer 420 may be a process using existing image processing technology, detailed description of image processing performed on the second image by the second image acquirer 420 will be omitted.

The generator 430 refers to the set of images registered in the normal image database 300 and generates a simulated image (a reference image) obtained by reproducing the second image acquired by the second image acquirer 420 from the first image output by the first image acquirer 410. The generator 430 outputs the generated reference image to the estimator 440. Details related to the configuration of the generator 430 and the process of generating the reference image will be described below.

The estimator 440 detects a different portion between circuit patterns copied in the reference image and the second image by comparing the reference image output by the generator 430 with the second image output by the second image acquirer 420 and estimates a defect in the circuit pattern incorporated when the mask is created. For example, the estimator 440 calculates a degree of matching between the reference image and the second image by taking a difference between the reference image and the second image and estimates a defect in the circuit pattern incorporated when the mask is created on the basis of the calculated degree of matching. The estimator 440 sets a position where the circuit pattern is different between the reference image and the second image as a position where a defect is estimated in the actual mask. More specifically, the estimator 440 compares pixel values of pixels at the same position (i.e., the same circuit pattern) in the reference image and the second image and estimates that the pixel (the circuit pattern) is defective when the difference in pixel values is greater than or equal to a predetermined threshold value. Also, the comparison between the reference image and the second image in the estimator 440 is not limited to each pixel, and, for example, may be performed for each predetermined area. The estimator 440 outputs a result of comparing the reference image with the second image, i.e., information of the position where the circuit pattern is different between the reference image and the second image, as information of a position where a defect is estimated in the actual mask to the display device 500 via a display controller (not shown), and causes the display device 500 to display the information.

Figure 3:
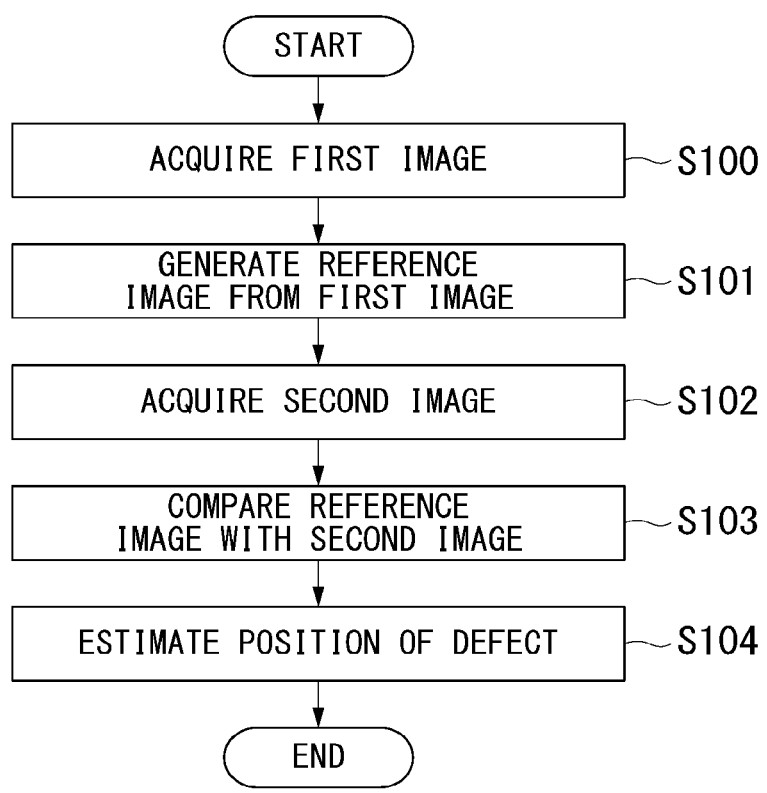
FIG. 3 is a flowchart showing a flow of a defect inspection operation in the defect inspection device according to the first embodiment.
Figure 4:
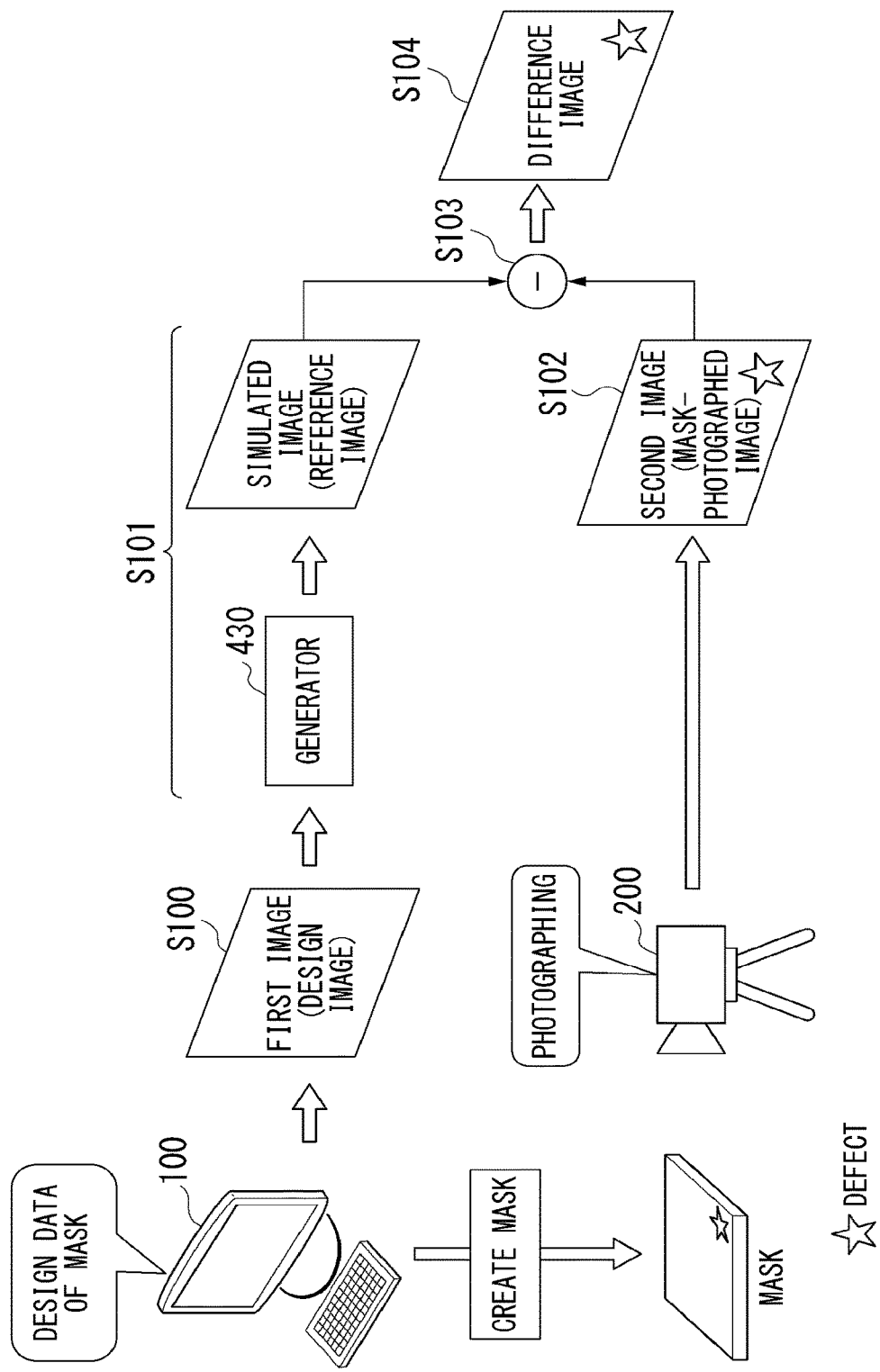
FIG. 4 is a diagram schematically showing the flow of the defect inspection operation in the defect inspection device according to the first embodiment.

Hereinafter, an outline of the operation of the defect inspection device 400 according to the first embodiment will be described. FIG. 3 is a flowchart showing a flow of a defect inspection operation in the defect inspection device 400 according to the first embodiment. Also, FIG. 4 is a diagram schematically showing a flow of a defect inspection operation in the defect inspection device 400 according to the first embodiment. In FIG. 4, corresponding step numbers in the flowchart shown in FIG. 3 are shown. In the flow of the defect inspection operation in the defect inspection device 400 to be described below, the flowchart shown in FIG. 3 will be described and the operation flow shown in FIG. 4 will be appropriately referred to.

When the defect inspection device 400 starts an operation, the first image acquirer 410 acquires a first image (a design image) output by the design data acquisition device 100 (step S100). Then, the first image acquirer 410 outputs the acquired first image to the generator 430.

Subsequently, the generator 430 refers to a set of images registered in the normal image database 300 and generates a simulated image (a reference image) obtained by reproducing the second image captured by the mask photographing device 200 from the first image output by the first image acquirer 410 (step S101). Then, the generator 430 outputs the generated reference image to the estimator 440.

Subsequently, the second image acquirer 420 acquires a second image (a mask-photographed image) actually captured by the mask photographing device 200 (step S102). Then, the second image acquirer 420 outputs the acquired second image to the generator 430.

Subsequently, the estimator 440 compares the reference image output by the first image acquirer 410 with the second image output by the second image acquirer 420 (step S103). The processing of step S103 may be performed in parallel with steps S100 and S101. Then, the estimator 440 estimates a position of a defect incorporated into the circuit pattern on the basis of a comparison result between the reference image and the second image (step S104). Then, the defect inspection device 400 outputs information of a position of the defect incorporated into the circuit pattern estimated by the estimator 440 to the display device 500 via the display controller (not shown) and ends the current defect inspection operation. Thereby, the display device 500 displays an image according to the position of the defect incorporated into the circuit pattern output by the defect inspection device 400 via the display controller (not shown). In FIG. 4, a state in which the display device 500 displays a difference image indicating the position of the defect incorporated into the circuit pattern is shown.

According to the above-described configuration and process, the defect inspection device 400 estimates a defect incorporated into the circuit pattern formed on the actual mask by comparing a reference image obtained by reproducing the second image captured by the mask photographing device 200 from the first image in which there is no defect in the circuit pattern created and output by the design data acquisition device 100 with the second image actually captured by the mask photographing device 200. Thereby, the mask defect inspection system 1 can easily and accurately inspect a defect incorporated into a circuit pattern formed on the mask when the mask is actually created.

Figure 5:
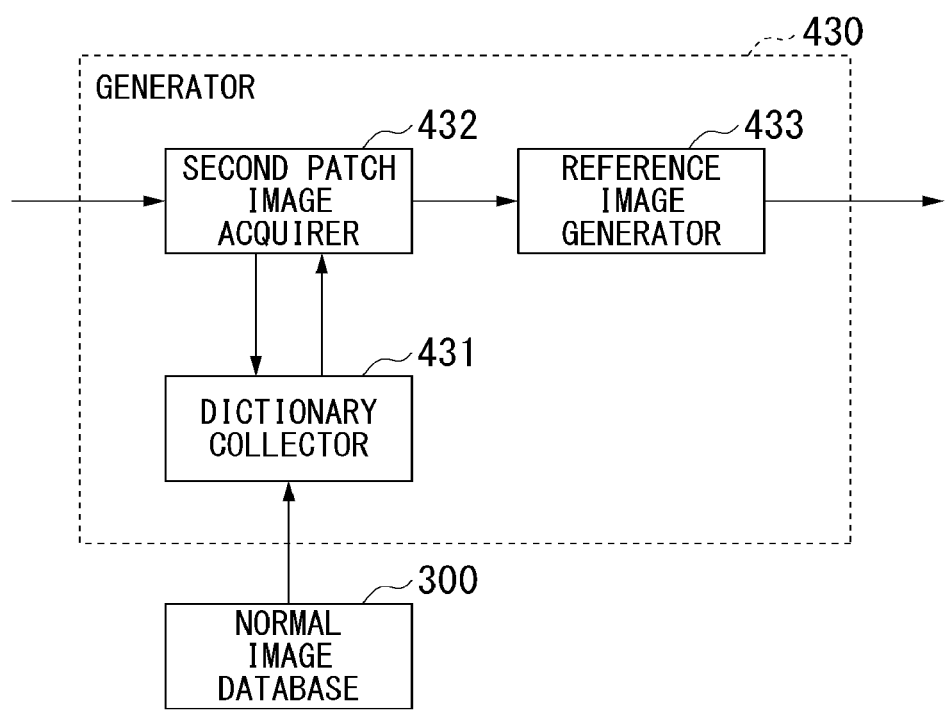
FIG. 5 is a block diagram showing a configuration of a generator.

Hereinafter, a configuration and a process of the generator 430 will be described in more detail. FIG. 5 is a block diagram showing a configuration of the generator 430. The generator 430 includes a dictionary collector 431, a second patch image acquirer 432, and a reference image generator 433.

The dictionary collector 431 obtains some or all sets of index data and correct data which are design patterns and resolutions corresponding to the second image of a target for allowing the defect inspection device 400 to inspect the defect in the circuit pattern from among sets of index data and correct data categorized and registered in the normal image database 300. The dictionary collector 431 may acquire all sets of index data and correct data which are design patterns and resolutions corresponding to the second image registered in the normal image database 300 or acquire a predetermined number of sets. Alternatively, for example, the dictionary collector 431 may acquire the most recently registered set or acquire a randomly selected set. The dictionary collector 431 extracts a plurality of patch images obtained by cutting out areas of a predetermined size from the index data and correct data included in each acquired set of index data and correct data and stores the extracted patch images as a dictionary. Hereinafter, the patch image cut out from the index data is referred to as a "first patch image" and the patch image cut out from the correct data is referred to as a "second patch image". The dictionary collector 431 retains the first patch image and the second patch image in association in a dictionary. These associated patch images are referred to as a patch image pair. The first patch image and the second patch image included in the patch image pair are images obtained by cutting out circuit patterns at relatively identical positions in the index data and the correct data. The sizes of the first patch image and the second patch image may both be unified to the same size, or may differ according to each set of associated patch images. However, for example, the size of each patch image is set on the basis of geometrical minimum processing dimensions such as a minimum wiring width, a straight line length, and curvature of a curve when a circuit is formed defined as standards for each semiconductor device manufacturing process. The dictionary collector 431 sets the number of patch image pairs retained as a dictionary within a range that does not exceed the storage capacity of a memory corresponding to the dictionary collector 431.

Figure 6:
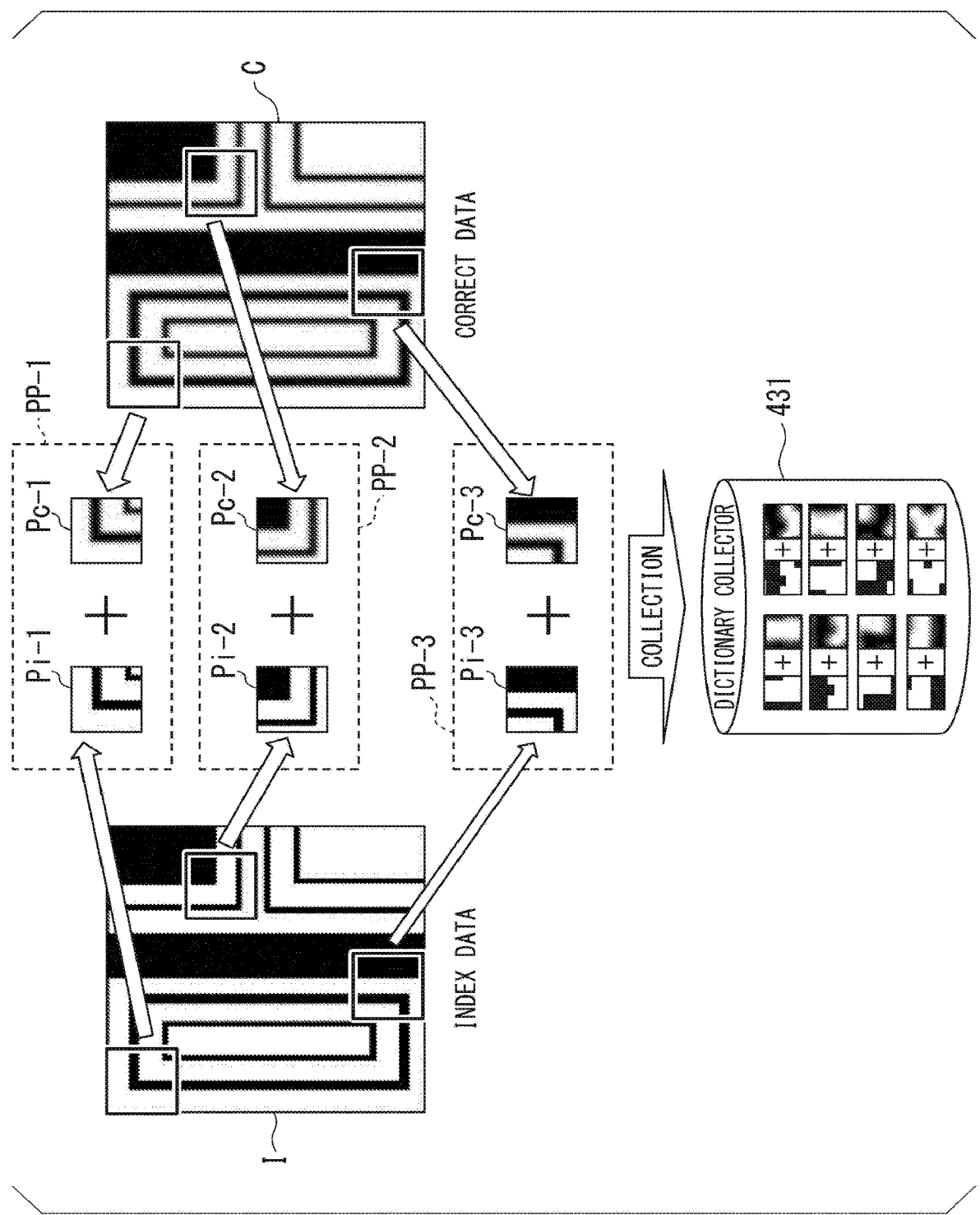
FIG. 6 is a diagram showing an example of patch images collected by a dictionary collector.

FIG. 6 is a diagram showing an example of patch images collected by the dictionary collector 431. In FIG. 6, an example in which the dictionary collector 431 retains a patch image pair PP in which a first patch image Pi cut out from index data I and a second patch image Pc cut out from correct data C are associated is shown. In the first patch image Pi and the second patch image Pc shown in FIG. 6, "-" added subsequent to a reference sign and a number subsequent thereto are used for identifying a corresponding relationship in the patch image pair. For example, the dictionary collector 431 collects a first patch image Pi-1 from the index data I, collects a second patch image Pc-1 from the correct data C, and associates the first patch image Pi-1 and the second patch image Pc-1 as one patch image pair PP-1. In the following description, when the first patch image Pi, the second patch image Pc, and the patch image pair PP are represented without being distinguished, they are represented without showing "-" and the number subsequent thereto.

Also, the dictionary collector 431 is not limited to a configuration in which the first patch image and the second patch image are retained as images. For example, a case in which the respective patch images retained as a patch image pair in the dictionary collector 431 include overlapping circuit patterns at the same position in the index data I and the correct data C between different patch image pairs when the cutout positions are close is also conceivable. In this case, the dictionary collector 431 may be configured to collect and retain only coordinates of cutout positions of the first patch image and the second patch image as the patch image pair instead of collecting and retaining the first patch image and the second patch image having overlapping circuit patterns as the patch image pair. In this case, the dictionary collector 431 may be configured to appropriately cut out and output the first patch image and the second patch image on the basis of the collected coordinates when the patch image pair is output to the second patch image acquirer 432 to be described below.

Also, for example, the dictionary collector 431 may be configured to convert one or both of the first patch image and the second patch image into patch image vector data obtained by performing dimensional reduction (compression) and retain the patch image vector data. For example, the dictionary collector 431 converts each patch image into patch image vector data represented by only a principal component having a predetermined contribution rate and retains the patch image vector data by performing principal component analysis on all collected first and second patch images. Thereby, the dictionary collector 431 can reduce the storage capacity of the memory required to retain one patch image pair as a dictionary and retain more patch image pairs with the same storage capacity of the memory.

Also, for example, the dictionary collector 431 may be configured to acquire sets of index data and correct data for a plurality of design patterns and a plurality of resolutions from the normal image database 300 and cluster and retain patch image pairs of similar design patterns and resolutions together without acquiring a set of index data and correct data which are a design pattern and resolution corresponding to a second image of a target from the normal image database 300 every time the defect inspection device 400 inspects a defect in the circuit pattern. For example, the dictionary collector 431 clusters the respective patch image pairs using a general clustering method (for example, a K-Means method or the like). At this time, the dictionary collector 431 may divide the respective patch image pairs into a large number of classes using, for example, a hierarchical expression such as a tree structure. Thereby, even when the number of patch image pairs to be retained becomes significantly large, the dictionary collector 431 can reduce the time required for a process in which the second patch image acquirer 432 extracts (searches for) patch image pairs to be described below.

Returning to FIG. 5, the second patch image acquirer 432 acquires a second patch image corresponding to the first image output by the first image acquirer 410 from the dictionary collector 431 and outputs the acquired second patch image to the reference image generator 433. In a process in which the second patch image acquirer 432 acquires the second patch image from the dictionary collector 431, the second patch image corresponding to the first image is acquired and output to the reference image generator 433 in the following processing procedure.

(Processing procedure 1): The second patch image acquirer 432 generates a cutout image obtained by cutting out an area having the same predetermined size as the first patch image (which is also the second patch image) from the first image output by the first image acquirer 410. For example, the second patch image acquirer 432 sets a sampling point at any position on the first image and cuts out an area having a predetermined size centered on the set sampling point from the first image to generate a cutout image.

(Processing procedure 2): The second patch image acquirer 432 extracts a first patch image similar to the generated cutout image from among the first patch images retained in the dictionary collector 431. At this time, for example, the second patch image acquirer 432 may extract one first patch image having the highest similarity or may extract a plurality of first patch images having a similarity greater than or equal to a predetermined value. Also, for example, when the patch image pairs retained in the dictionary collector 431 are clustered, the second patch image acquirer 432 may extract first patch images of one cluster having a highest similarity from among a plurality of patch image pairs grouped in the same class or may extract first patch images having a highest similarity one by one from among a plurality of patch image pairs grouped in the same class. It is only necessary for the similarity to be an index for enabling a distance between vectors in the cutout image and the first patch image to be measured. Also, for example, the second patch image acquirer 432 may regard arrangements of pixels constituting the cutout image and the first patch image as vectors and use an L1 or L2 norm of a difference between these vectors as a similarity. Also, the second patch image acquirer 432 may set, for example, a square error or a normalized cross-correlation value in each of the cut image and the first patch image as the similarity.

(Processing procedure 3): The second patch image acquirer 432 acquires the second patch image associated with the extracted first patch image as a patch image pair. At this time, for example, when one first patch image having a highest similarity has been extracted, the second patch image acquirer 432 acquires one second patch image associated with the extracted first patch image. Also, for example, when a plurality of first patch images having a similarity greater than or equal to a predetermined value have been extracted, the second patch image acquirer 432 acquires the second patch image associated with each extracted first patch image. Then, the second patch image acquirer 432 outputs the acquired second patch image to the reference image generator 433. At this time, the second patch image acquirer 432 outputs information representing a position of a sampling point set on the first image to the reference image generator 433 together with the acquired second patch image. Also, the second patch image acquirer 432 may associate information of a similarity to the first image with the second patch image and output the information associated with the second patch image to the reference image generator 433.

The second patch image acquirer 432 acquires each second patch image corresponding to the whole of the first image by iteratively performing such a processing procedure while sequentially moving the position of the cutout image cut out from the first image and outputs the acquired second patch image to the reference image generator 433. In other words, the second patch image acquirer 432 acquires each second patch image corresponding to the entire first image while setting a plurality of sampling points so that the entire area of the first image is covered (so that the second patch image is assigned to all pixels constituting at least the first image) and outputs the acquired second patch image to the reference image generator 433.

The reference image generator 433 generates a reference image obtained by reproducing the second image acquired by the second image acquirer 420 from the first image output by the first image acquirer 410 (the second image captured by the mask photographing device 200) by combining the respective second patch images output by the second patch image acquirer 432. At this time, the reference image generator 433 combines the respective second patch images on the basis of information of sampling points on the first image output by the second patch image acquirer 432. The reference image generator 433 outputs the generated reference image to the estimator 440.

Figure 7:
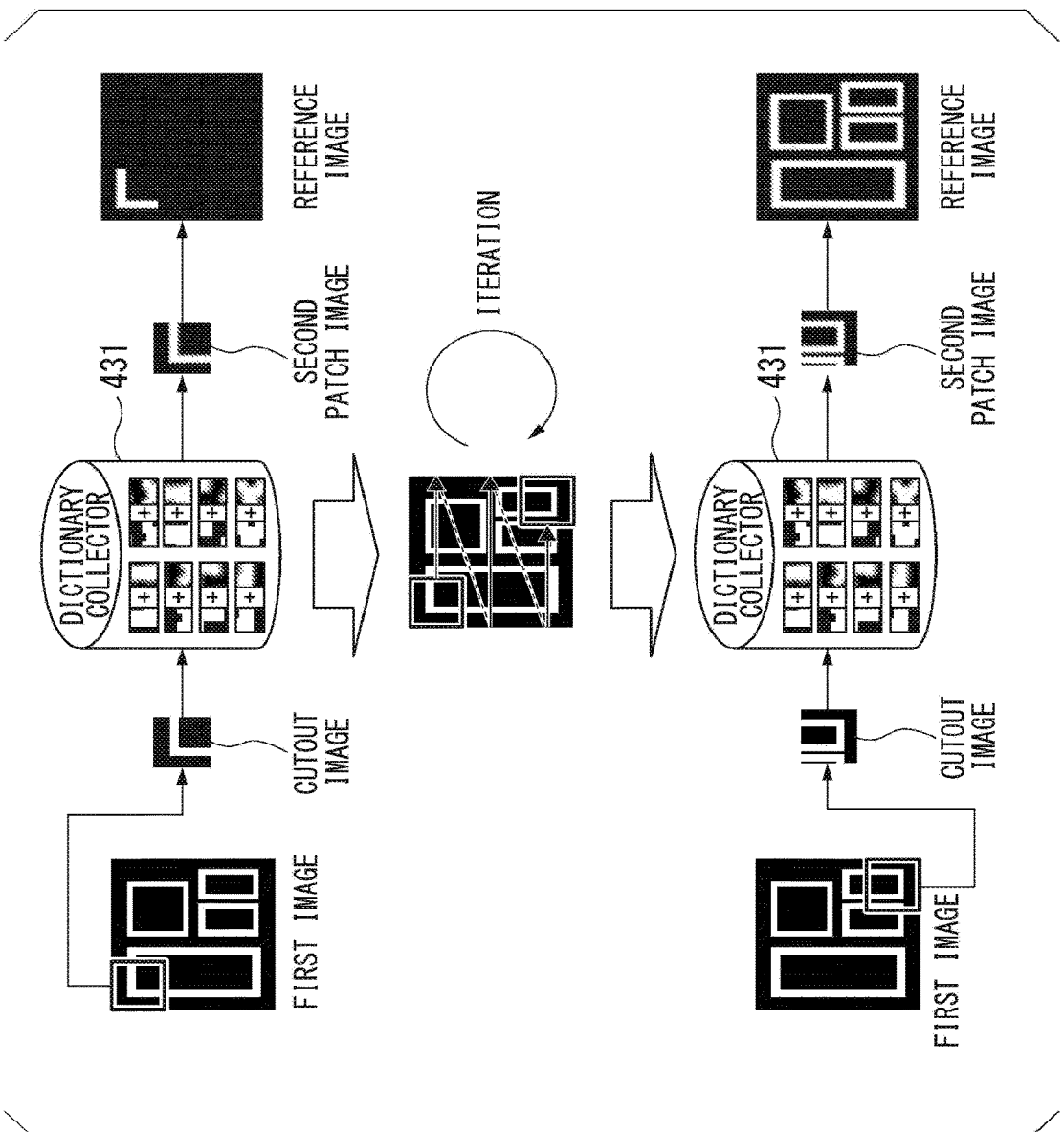
FIG. 7 is a diagram schematically showing an overall flow of a process of generating a reference image in the generator.

FIG. 7 is a diagram schematically showing the overall flow of a process of generating a reference image in the generator 430. In FIG. 7, an example of a flow of a process in which the second patch image acquirer 432 acquires second patch images Pc and the reference image generator 433 generates a reference image by combining the second patch images Pc is schematically shown.

For example, the second patch image acquirer 432 acquires a second patch image associated with a first patch image similar to a cutout image of an upper left area of the first image as shown in the upper part of FIG. 7 and outputs the second patch image to the reference image generator 433 according to a first process of the above-described processing procedures 1 to 3. Thereby, the reference image generator 433 generates a reference image corresponding to the upper left area of the first image.

Thereafter, the second patch image acquirer 432 iterates the process of the above-described processing procedures 1 to 3. In the middle part of FIG. 7, a case in which the second patch image acquirer 432 acquires each second patch image corresponding to the whole of the first image by moving an area from which a cutout image is cut out in a so-called raster order in which an area from which a cutout image is cut out is moved from the upper left to the upper right of the first image, subsequently moved to the right of the first image by returning to the left side of the first image, and further moved from the lower left to the lower right of the first image and outputs the acquired second patch image to the reference image generator 433 is shown. Also, the order in which the second patch image acquirer 432 acquires each second patch image corresponding to the whole of the first image, i.e., the order in which the area from which the cutout image is cut out is moved, is not limited to the raster order.

Then, for example, the second patch image acquirer 432 acquires a second patch image associated with a first patch image similar to a cutout image of the lower right area of the first image as shown in the lower part of FIG. 7 according to the final process of processing procedures 1 to 3 described above and outputs the acquired second patch image to the reference image generator 433. Thereby, the reference image generator 433 generates a reference image corresponding to the lower right area of the first image. As shown in FIG. 7, in the generator 430, the second patch image acquirer 432 acquires respective second patch images corresponding to the whole of the first image to output the acquired second patch images to the reference image generator 433 and the reference image generator 433 combines the second patch images output by the second patch image acquirer 432. Thereby, the reference image generator 433 generates a reference image obtained by reproducing the whole of the second image output by the mask photographing device 200 from the first image.

Also, if the second patch image acquirer 432 assigns sampling points densely on the first image, the number of cutout images cut out from the first image increases and the number of second patch images that are output to the reference image generator 433 also increases. In this case, it is also conceivable that a plurality of second patch images output to the second patch image acquirer 432 include overlapping circuit patterns at identical positions in the first image. Also, even when the second patch image acquirer 432 extracts a plurality of first patch images and acquires a second patch image associated with each extracted first patch image, a plurality of second patch images include overlapping circuit patterns at identical positions in the first image. In this case, the reference image generator 433 determines pixel values of pixels of sampling points set by the second patch image acquirer 432 in the generated reference image on the basis of the plurality of second patch images output by the second patch image acquirer 432.

Figure 8:
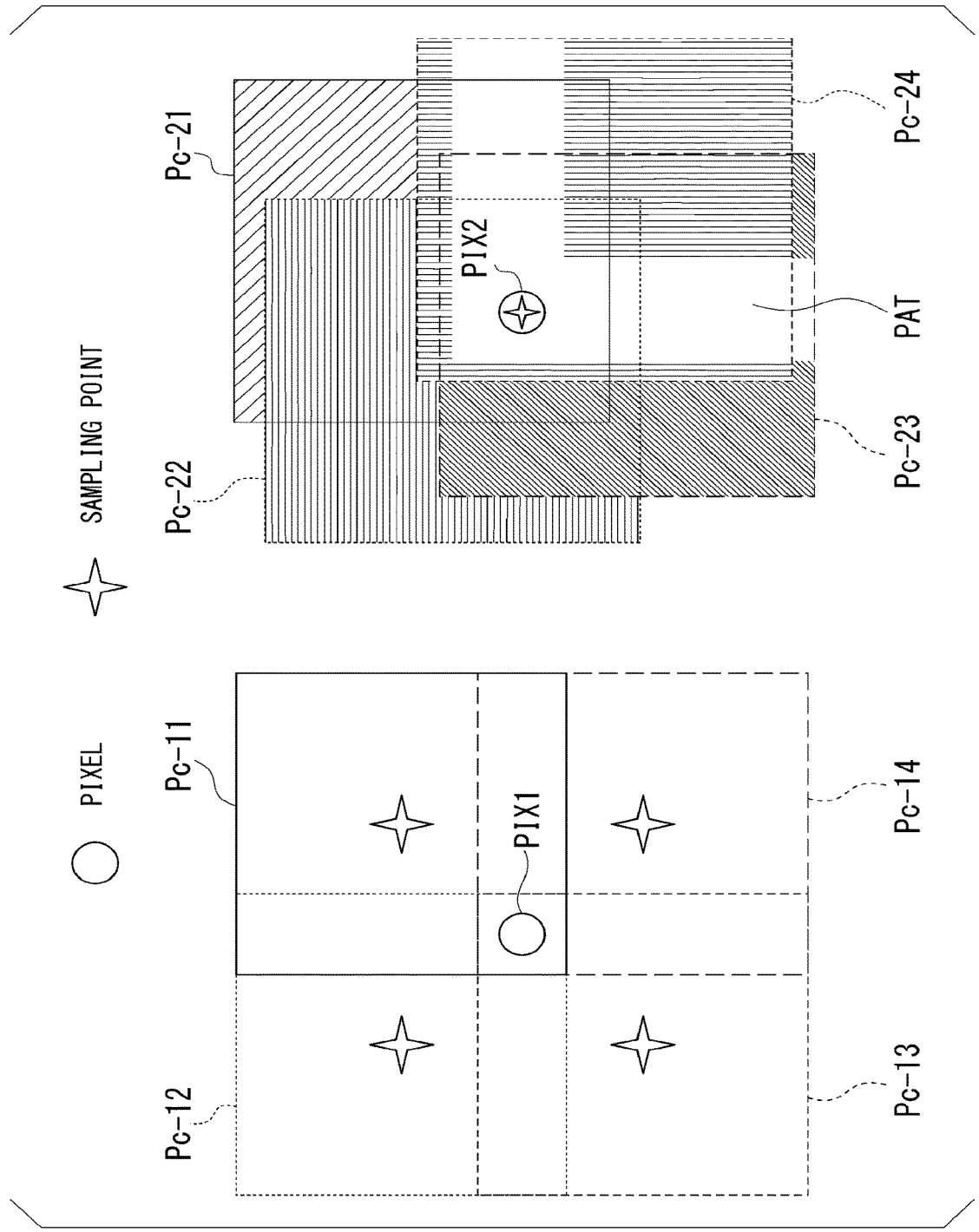
FIG. 8 is a diagram schematically showing an example of a process of generating a reference image from a plurality of second patch images in the generator.

FIG. 8 is a diagram schematically showing an example of a process of generating a reference image from a plurality of second patch images in the generator 430. An example in which a pixel value of an overlapping pixel PIX (pixel PIX1) of the reference image is determined on the basis of four different second patch images Pc (second patch images Pc-11 to Pc-14) extracted by the second patch image acquirer 432 with respect to different sampling points is shown on the left side of FIG. 8. Also, an example in which a pixel value of a pixel PIX (pixel PIX2) of the reference image representing an overlapping circuit pattern PAT is determined on the basis of four second patch images Pc (second patch images Pc-21 to Pc-24) extracted by the second patch image acquirer 432 with respect to the same sampling point is shown on the right side of FIG. 8.

In any case shown in FIG. 8, the reference image generator 433 sets an average value obtained by averaging pixel values of positions of the pixels PIX included in the second patch images Pc overlapping at a position of the pixel PIX constituting the reference image as a pixel value of the pixel PIX. Thus, the image quality of the reference image generated by the reference image generator 433 can be improved by determining the pixel values of the pixels constituting the reference image on the basis of the plurality of second patch images.

Also, when a similarity to a first image is associated with each second patch image Pc output by the second patch image acquirer 432, for example, the reference image generator 433 may set the similarity associated with each second patch image Pc as a weight when pixel values are averaged. That is, the reference image generator 433 may set the pixel value of the pixel PIX constituting the reference image as a weighted average value of the pixel values at the positions of the pixels PIX included in the respective second patch images Pc. As shown on the right side of FIG. 8, it is considered that there is an advantage due to improving image quality of the reference image generated by the reference image generator 433 when the second patch image acquirer 432 has extracted a plurality of second patch images Pc with respect to the same sampling point.

Also, when the second patch image acquirer 432 outputs a plurality of second patch images associated with the first patch image to the reference image generator 433 by assigning sampling points densely on the first image or extracting a plurality of first patch images, the number of times the second patch image acquirer 432 exchanges data with the dictionary collector 431 is considered to be large as compared with a case in which one first patch image is extracted and one second patch image is output. In other words, a load of a process in which the second patch image acquirer 432 acquires the second patch image is considered to increase. Thus, it is necessary to determine the number of sampling points assigned to the first image by the second patch image acquirer 432 or the number of first patch images to be extracted in consideration of the trade-off with image quality required for a reference image generated by the reference image generator 433. Thus, an example in which a load of a process in which the second patch image acquirer 432 acquires a second patch image is reduced such as a case in which sampling points are set to be sparse in a portion in which circuit patterns are sparse in the first image is conceivable.

According to the above-described configuration and process, the generator 430 outputs a reference image obtained by reproducing a second image acquired by the second image acquirer 420 (a second image captured by the mask photographing device 200) from a first image acquired by the first image acquirer 410 (a first image in which there is no defect in the circuit pattern created and output by the design data acquisition device 100) to the estimator 440. Thereby, the estimator 440 compares the reference image output by the generator 430 with the second image output by the second image acquirer 420 and estimates that a portion of a different circuit pattern in the reference image and the second image is a portion where a defect is incorporated into the circuit pattern formed on an actual mask. At this time, as described above, the estimator 440 estimates a position of a pixel where a difference between pixel values of pixels at the same position in the reference image and the second image is greater than or equal to a predetermined threshold value as a defective position. Thus, the estimator 440 calculates a difference between pixel values at each pixel position in the reference image and the second image. Also, when the reference image and the second image are compared, the estimator 440 may calculate a difference between pixel values at each pixel position after one or both of the reference image and the second image are averaged by, for example, an averaging filter or the like. Also, when the reference image and the second image are compared, the estimator 440 may calculate a difference between pixel values at each pixel position after one or both of the reference image and the second image are sharpened by, for example, an edge enhancement filter or the like.

Also, although the reference image output by the generator 430 is a second image (a mask-photographed image) determined not to be defective in the previous mask defect inspection as described above, the reference image is generated from a plurality of mask-photographed images captured in the previous mask defect inspection. Here, as described above, the mask-photographed image is classified (categorized) on the basis of information about capturing of the mask-photographed image in the normal image database 300 and the information about the capturing of the mask-photographed image is a photographing condition such as a magnification when a mask is photographed or resolution of the mask-photographed image. In other words, the information about the capturing of the mask-photographed image does not include, for example, brightness or the like when an actual mask is photographed. Thus, the second patch images to be combined to generate the reference image do not necessarily have the same dynamic range of brightness. That is, the pixel value of a pixel representing a circuit pattern such as wiring formed on an actual mask is not necessarily the same pixel value in all second patch images to be combined as a reference image. Thus, the estimator 440 may be configured to compare the reference image with the second image after the dynamic range for each of the reference image and the second image is adjusted. For example, the estimator 440 may be configured to make a comparison after a difference due to an average value difference between the reference image and the second image (a so-called direct current component difference) is eliminated by subtracting an average value of pixel values in each of the reference image and the second image. Also, for example, the estimator 440 may be configured to normalize pixel values of each of the reference image and the second image and make a comparison between normalized images.

Also, the estimator 440 may represent a difference between the reference image and the second image according to a correlation as a result of comparing the reference image with the second image. At this time, the estimator 440 may cut out all of the reference image and the second image or some thereof at the same position and then obtain a correlation thereof according to a normalized cross-correlation or the like. In this case, the estimator 440 assumes that a difference between the reference image and the second image is smaller when the correlation between the images is higher. In this case, the estimator 440 outputs an estimation result (an inspection result) indicating that no defect is incorporated into the circuit pattern formed on the actual mask to the display device 500 via the display controller (not shown).

As described above, in the mask defect inspection system 1 including the defect inspection device 400 according to the first embodiment, the defect inspection device 400 generates a reference image obtained by reproducing a second image captured by the mask photographing device 200 from a first image in which there is no defect in the circuit pattern created and output by the design data acquisition device 100 and estimates a portion of a defect incorporated into the circuit pattern formed on the actual mask by comparing the generated reference image with a second image actually captured by the mask photographing device 200. Thereby, in the mask defect inspection system 1 including the defect inspection device 400 according to the first embodiment, it is possible to easily and accurately inspect the defect incorporated into the circuit pattern when the mask is actually created.

Also, a configuration in which a set of images in which index data (a design image) and correct data (a mask-photographed image) determined not to be defective in the previous mask defect inspection are associated is registered in the normal image database 300 constituting the mask defect inspection system 1 has been described above. In the first embodiment, a configuration in which a dictionary obtained by collecting a patch image pair in which a first patch image and a second patch image cut out from index data and correct data included in a set of images registered in the normal image database 300 are associated is retained within the generator 430 (more specifically, the dictionary collector 431) provided in the defect inspection device 400 constituting the mask defect inspection system 1 and the generator 430 generates a reference image has been described. In other words, the configuration in which the mask defect inspection system 1 retains image data (which also includes data of a feature quantity of a circuit pattern) used for generating a reference image in two stages has been described in the first embodiment. However, the configuration in which image data for generating a reference image for use in defect inspection is retained in the mask defect inspection system 1 is not limited to the configuration shown in the first embodiment. For example, the normal image database 300 may have a configuration in which a patch image pair in which a first patch image and a second patch image cut out from a set of images are associated is also registered and retained in addition to a set of images in which index data and correct data are associated. In this case, the generator 430 does not include the dictionary collector 431 and may have a configuration in which the second patch image acquirer 432 directly extracts a first patch image similar to a cutout image from among the first patch images retained in the normal image database 300 and directly acquires the second patch image associated with the extracted first patch image from the normal image database 300.

As described above, the defect inspection device 400 includes the first image acquirer 410 configured to acquire a first image (a design image) of a mask of an inspection target created in a first creation method (a method of a predetermined process of creating the first image on the basis of design data); the second image acquirer 420 configured to acquire a second image (a mask-photographed image) obtained by photographing the mask of the inspection target;

the generator 430 configured to extract index data similar to the acquired first image with reference to the normal image database 300 in which a third image created in the first creation method (a design image created on the basis of design data of another semiconductor device) or the index data that is a feature quantity obtained by the third image is associated with correct data that is used as a comparison target of the index data and is an image (a mask-photographed image) determined not to be defective in previous mask defect inspection, acquire the correct data associated with the extracted index data in the normal image database 300, and generate a reference image on the basis of the acquired correct data; and the estimator 440 configured to estimate a pixel corresponding to a defective position on the mask of the inspection target photographed in the second image by comparing the reference image with the second image.

Also, as described above, in the defect inspection device 400, the index data may be a first patch image obtained by cutting out an area of a predetermined size from the third image, the correct data may be a second patch image obtained by cutting out an area of a size corresponding to the first patch image from an image determined not to be defective, and the generator 430 may include the second patch image acquirer 432 configured to extract the first patch image having a high similarity to a cutout image obtained by cutting out an area of a size corresponding to the first patch image from the first image and acquire the second patch image associated with the extracted first patch image; and the reference image generator 433 configured to generate the reference image obtained by reproducing the second image from the first image on the basis of the acquired second patch image.

Also, as described above, in the defect inspection device 400, the generator 430 may include the dictionary collector 431 configured to collect patch image pairs in which a first patch image obtained by cutting out an area of a predetermined size from the third image constituting the index data is associated with a second patch image obtained by cutting out an area of a size corresponding to the first patch image from an image determined not to be defective constituting the correct data and retain the collected patch image pairs as a dictionary; the second patch image acquirer 432 configured to extract the patch image pair including the first image having a high similarity to a cutout image obtained by cutting out an area of a size corresponding to the first patch image from the first image from among the patch image pairs collected by the dictionary collector and acquire the second patch image associated in the extracted patch image pair from the dictionary collector; and the reference image generator 433 configured to generate the reference image obtained by reproducing the second image from the first image on the basis of the acquired second patch image.

Also, as described above, in the defect inspection device 400, the second patch image acquirer 432 may extract the first patch image having a high similarity to the cutout image on the basis of a square error in each of the cutout image and the first patch image or a normalized cross-correlation value.

Also, as described above, in the defect inspection device 400, the second patch image acquirer 432 may extract a plurality of first patch images having a similarity greater than or equal to a predetermined value to the cutout image and acquire the second patch image associated with each first patch image that has been extracted, and the reference image generator 433 may obtain a pixel value of a pixel constituting the generated reference image by averaging pixel values of pixels shown at the same position included in second patch images that have been acquired.

Also, as described above, in the defect inspection device 400, the estimator 440 may normalize a pixel value of a pixel constituting each of the reference image and the second image and estimate the pixel corresponding to the defective position on the mask of the inspection target photographed in the second image by comparing pixel values obtained by normalizing pixels of the same position.

Also, as described above, in the defect inspection device 400, the estimator 440 may estimate a pixel for which a difference between pixel values of pixels of the same position in the reference image and the second image is greater than or equal to a predetermined threshold value as a defective pixel.

Also, the defect inspection device 400 is implemented by a processor such as a CPU or a GPU or hardware such as an LSI, an ASIC, or an FPGA, a dedicated LSI, and the like and includes a storage device such as a ROM, a RAM, an HDD, or a flash memory. The defect inspection device 400 may be a device for executing a defect inspection method in which the processor acquires a first image (a design image) of a mask of an inspection target created in a first creation method (a method of a predetermined process of creating the first image on the basis of design data); acquires a second image (a mask-photographed image) obtained by photographing the mask of the inspection target; extracts index data similar to the acquired first image with reference to the normal image database 300 in which a third image created in the first creation method (a design image created on the basis of design data of another semiconductor device) or the index data that is a feature quantity obtained by the third image is associated with correct data that is used as a comparison target of the index data and is an image (a mask-photographed image) determined not to be defective in previous mask defect inspection, acquires the correct data associated with the extracted index data in the normal image database 300, and generates a reference image on the basis of the acquired correct data; and estimates a pixel corresponding to a defective position on the inspection target photographed in the second image by comparing the reference image with the second image.

Also, the defect inspection device 400 is implemented by a processor such as a CPU or a GPU or hardware such as an LSI, an ASIC, or an FPGA, a dedicated LSI, and the like and includes a storage device such as a ROM, a RAM, an HDD, or a flash memory. The defect inspection device 400 may be a device having a storage device storing a program for causing a processor to acquire a first image (a design image) of a mask of an inspection target created in a first creation method (a method of a predetermined process of creating the first image on the basis of design data); acquire a second image (a mask-photographed image) obtained by photographing the mask of the inspection target; extract index data similar to the acquired first image with reference to the normal image database 300 in which a third image created in the first creation method (a design image created on the basis of design data of another semiconductor device) or the index data that is a feature quantity obtained by the third image is associated with correct data that is used as a comparison target of the index data and is an image (a mask-photographed image) determined not to be defective in previous mask defect inspection, acquire the correct data associated with the extracted index data in the normal image database 300, and generate a reference image on the basis of the acquired correct data; and estimate a pixel corresponding to a defective position on the inspection target photographed in the second image by comparing the reference image with the second image.

Second Embodiment

Hereinafter, a defect inspection device according to a second embodiment will be described. In the defect inspection device 400 according to the first embodiment, a reference image is generated on the basis of a first patch image and a second patch image respectively cut out from index data and correct data included in a set of images categorized and registered in the normal image database 300. Because this reference image is generated in a pseudo manner on the basis of a set of index data and correct data of a design pattern and resolution corresponding to a second image of a target for which the defect inspection device 400 inspects a defect in the circuit pattern, the second image actually captured and output by the mask photographing device 200 is considered to have high reproducibility. However, when a new circuit pattern that is not included in index data registered in the normal image database 300 is copied in the second image output by the mask photographing device 200, there is concern that the reproducibility is low in a reference image including the new circuit pattern. This is because a case in which the second patch image acquirer 432 extracts a first patch image having a lower similarity than other portions in a portion of the new circuit pattern and the reference image generator 433 generates a reference image by combining second patch images associated with the first patch image having the lower similarity is conceivable. Then, there is concern that the estimator 440 is likely to erroneously estimate that there is a defect in a portion of a new circuit pattern even when there is no defect in the portion of the new circuit pattern in the actual mask. Thus, the defect inspection device according to the second embodiment includes a configuration in which a patch image pair (a first patch image and a second patch image which is not defective) corresponding to a new circuit pattern is added to or updated in the dictionary collector 431 (so-called rewriting) and is intended to improve the reproducibility of a reference image to be subsequently generated.

Also, the defect inspection device according to the second embodiment is provided in place of the defect inspection device 400 in the configuration of the mask defect inspection system 1 shown in FIG. 1. In other words, a configuration of a mask defect inspection system including the defect inspection device according to the second embodiment is a configuration in which the defect inspection device 400 in the configuration of the mask defect inspection system 1 including the defect inspection device 400 according to the first embodiment shown in FIG. 1 is replaced with the defect inspection device according to the second embodiment. In the following description, the mask defect inspection system including the defect inspection device according to the second embodiment is referred to as a "mask defect inspection system 2".

Also, the constituent elements provided in the defect inspection device according to the second embodiment include constituent elements similar to those provided in the defect inspection device 400 according to the first embodiment. Accordingly, in the following description, the same reference signs are given to constituent elements similar to those of the defect inspection device 400 according to the first embodiment among constituent elements of the defect inspection device according to the second embodiment and detailed description of the constituent elements will be omitted.

Figure 9:
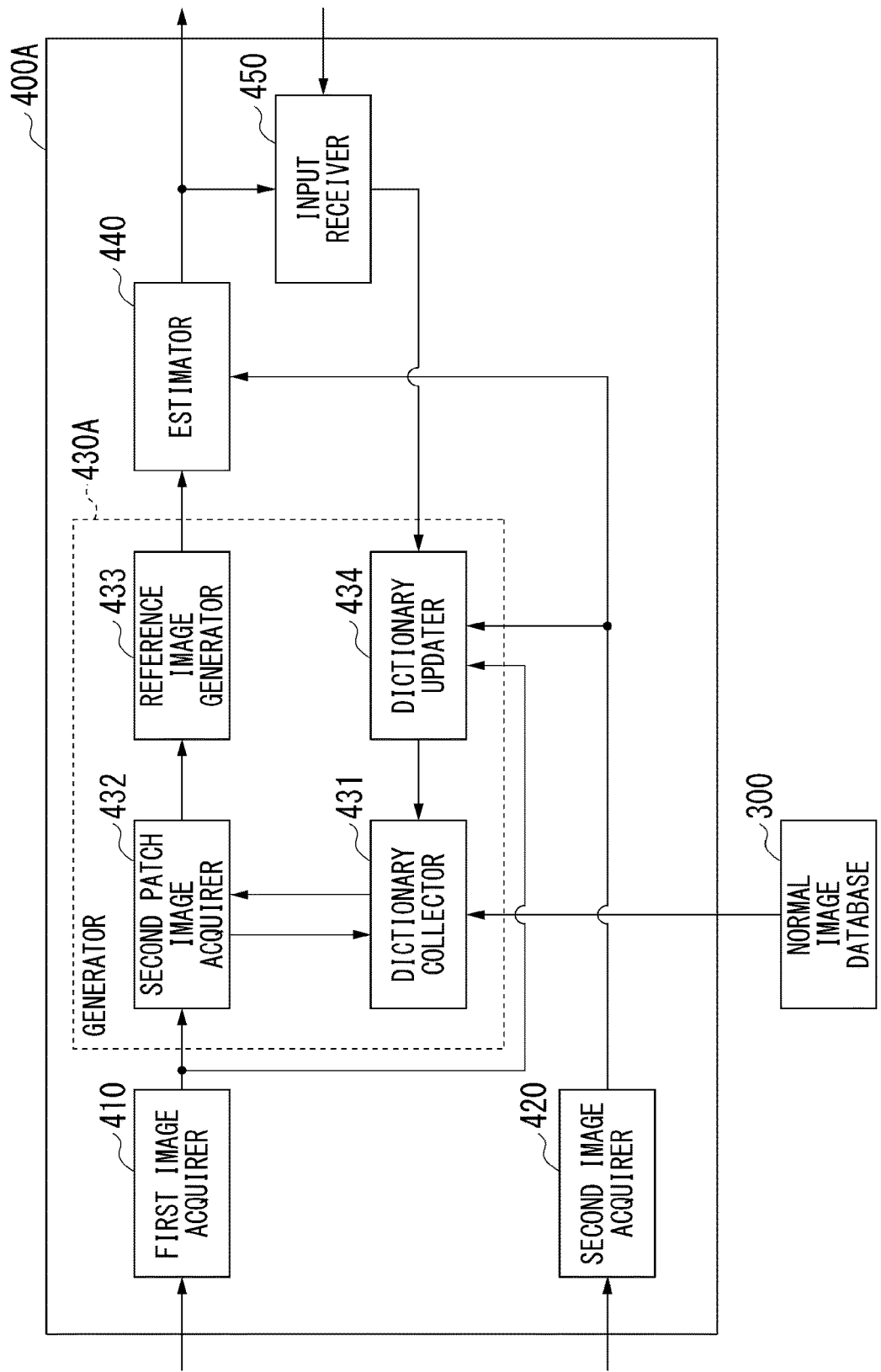
FIG. 9 is a block diagram showing an example of a configuration of a defect inspection device according to a second embodiment.

FIG. 9 is a block diagram showing an example of a configuration of the defect inspection device according to the second embodiment. A defect inspection device 400A includes the first image acquirer 410, the second image acquirer 420, a generator 430A, the estimator 440, and an input receiver 450. Also, the generator 430A includes the dictionary collector 431, the second patch image acquirer 432, the reference image generator 433, and a dictionary updater 434. Also, in the following description, as in the first embodiment, it is assumed that index data is a design image and correct data is a mask-photographed image.

The input receiver 450 receives an input of an operation (an instruction) for adding or updating a patch image pair for the dictionary collector 431. For example, the instruction for adding or updating a patch image pair for the dictionary collector 431 is input by a person (a user) who executes mask defect inspection operating a user interface (not shown) provided in the display device 500 configured as a touch panel. Also, for example, as described above, the input of an instruction for adding or updating a patch image pair by the user is assumed to be performed when the estimator 440 erroneously performs the estimation of the defect in the circuit pattern (incorrect determination) such as when the estimator 440 estimates that there is a defect in the circuit pattern and an image indicating a position of the defect is displayed on the display device 500 and presented to the user but there is no defect in the actual mask. When the input of an instruction for adding or updating a patch image pair is received, the input receiver 450 acquires a result of comparing the reference image and the second image output by the estimator 440, i.e., information of a position (a pixel position) where a circuit pattern is different between the reference image and the second image, and outputs the acquired information of the position to the generator 430A.

Similar to the generator 430 provided in the defect inspection device 400 according to the first embodiment, the generator 430A generates a simulated image (a reference image) obtained by reproducing a second image acquired by the second image acquirer 420 (captured by the mask photographing device 200) from a first image output by the first image acquirer 410 with reference to a set of images registered in the normal image database 300 and outputs the generated reference image to the estimator 440. Also, the generator 430A generates a new patch image pair on the basis of information of a position where the circuit pattern output by the input receiver 450 receiving the input of the instruction for adding or updating the patch image pair is different and adds (or updates) the generated new patch image pair to (or in) the dictionary retained in the dictionary collector 431.

The dictionary updater 434 generates a new patch image pair on the basis of the information of the position where the circuit pattern output by the input receiver 450 is different. The dictionary updater 434 generates a new patch image pair from current first and second images (a new first patch image and a non-defective second patch image associated with the new first patch image) on which mask defect inspection has been performed in the defect inspection device 400A. More specifically, the dictionary updater 434 generates a new first patch image by cutting out an area having the same size as the first patch image retained in the dictionary collector 431 from the first image output by the design data acquisition device 100. At this time, the dictionary updater 434 cuts out a new first patch image from the first image around a position (a pixel position) where the circuit pattern output by the input receiver 450 is different. Also, the dictionary updater 434 generates a new second patch image by cutting out an area having a size corresponding to the new first patch image from the second image output by the mask photographing device 200. The dictionary updater 434 causes the dictionary collector 431 to retain a generated new patch image pair. Thereby, the new patch image pair generated by the dictionary updater 434 is added to the dictionary retained in the dictionary collector 431. That is, a patch image pair corresponding to a portion of a new circuit pattern erroneously estimated by the estimator 440 to have a defect in the circuit pattern is added to the dictionary retained in the dictionary collector 431.

Also, the dictionary updater 434 causes a new patch image pair to be added to and retained in the dictionary collector 431 so that the current clustering state in the dictionary collector 431 is maintained. For example, when the dictionary updater 434 performs dividing into classes using a hierarchical expression such as a tree structure, a new patch image pair is added to a cluster of a representative point having a highest image similarity without changing the hierarchical structure in the dictionary collector 431. Also, the dictionary updater 434 may add a new patch image pair and cluster the dictionaries again using a clustering method when the dictionary collector 431 collects the dictionaries.

Also, when a new patch image pair is added to and updated in the dictionary retained in the dictionary collector 431 and when a patch image pair having the same part as the new patch image pair is already collected in the dictionary, the dictionary updater 434 may perform update (so-called replacement) by deleting an already collected patch image pair or perform update by averaging the already collected patch image pair and the new patch image pair. At this time, the dictionary updater 434 may switch whether to add a new patch image pair, replace a patch image pair, or average patch image pairs, for example, according to selection by the person (the user) who executes mask defect inspection.

Because the configuration of the new patch image pair added to the dictionary collector 431 by the dictionary updater 434 is similar to that of an example of a patch image collected in the dictionary collector 431 shown in FIG. 6, a detailed description thereof will be omitted.

According to the above-described configuration and process, the defect inspection device 400A causes the dictionary collector 431 to add and retain a new patch image pair corresponding to a circuit pattern portion which is not defective in an actual mask, but is erroneously estimated to be defective in the circuit pattern by the estimator 440. Thereby, in the subsequent mask defect inspection in the mask defect inspection system 2, the defect inspection device 400A extracts a new first patch image for a portion of a new circuit pattern and generates a reference image using a second patch image associated with the new first patch image. In other words, the reproducibility of the reference image to be subsequently generated in the defect inspection device 400A is improved. Thereby, the mask defect inspection system 2 can easily and accurately inspect a defect incorporated into a circuit pattern formed on the mask when the mask is actually created.

As described above, also in the mask defect inspection system 2 including the defect inspection device 400A according to the second embodiment, as in the mask defect inspection system 1 including the defect inspection device 400 according to the first embodiment, the defect inspection device 400A generates a reference image obtained by reproducing the second image from a first image that does not have a defect in the circuit pattern output by the design data acquisition device 100 and estimates a portion of a defect incorporated into a circuit pattern formed on the actual mask by comparing the generated reference image with a second image actually captured by the mask photographing device 200. Thereby, also in the mask defect inspection system 2 including the defect inspection device 400A according to the second embodiment, as in the mask defect inspection system 1 including the defect inspection device 400 according to the first embodiment, it is possible to easily inspect a defect incorporated into a circuit pattern with high accuracy when the mask is actually created.

Moreover, in the mask defect inspection system 2 including the defect inspection device 400A according to the second embodiment, when the defect inspection device 400A has erroneously estimated that a non-defective portion in the actual mask is defective, for example, a new patch image pair corresponding to a portion of a new circuit pattern is generated in accordance with an instruction from the person (the user) who executes mask defect inspection and added to (or updated in) the dictionary retained in the dictionary collector 431. Thereby, in the mask defect inspection system 2 including the defect inspection device 400A according to the second embodiment, the reproducibility of the reference image to be subsequently generated is improved and it is possible to inspect a defect incorporated into the circuit pattern when the mask is actually created with higher accuracy.

Also, a case in which the dictionary updater 434 adds a new patch image pair to the dictionary collector 431 in the defect inspection device 400A has been described above. However, the defect inspection device 400A is not limited to a configuration in which a new patch image pair is added to the dictionary collector 431 by the dictionary updater 434. For example, the defect inspection device 400A may have a configuration in which original first and second images from which an added new patch image pair (a first patch image and a second patch image) is cut out are also added to the normal image database 300 when the dictionary updater 434 has added a new patch image pair to the dictionary collector 431. Also, for example, the defect inspection device 400A may have a configuration in which a patch image pair generated by the dictionary updater 434 and added to the dictionary collector 431 is also added to the normal image database 300 when the normal image database 300 has a configuration in which a patch image pair is also registered and retained.

As described above, in the defect inspection device 400A, the generator 430A may further include the dictionary updater 434 configured to acquire each of a position where a circuit pattern of a mask of the inspection target is different (a position of a pixel corresponding to a defective position) photographed in the second image erroneously estimated to be defective by the estimator 440, the first image, and the second image and add the patch image pair in which the first patch image and the second patch image obtained by cutting out areas of the predetermined size including the position of the pixel erroneously estimated to be defective from the acquired first and second images in accordance with a received operation (instruction) of adding the patch image pair to the dictionary collector 431 are associated to the dictionary retained in the dictionary collector 431.

Third Embodiment

Hereinafter, a defect inspection device according to a third embodiment will be described. In the defect inspection device 400 according to the first embodiment and the defect inspection device 400A according to the second embodiment, a configuration in which an estimation result (an inspection result) of the estimator 440 estimating a defect incorporated into an actual mask is presented to a person (a user) who executes mask defect inspection has not been described in detail. In the defect inspection device according to the third embodiment, a configuration in which the estimator 440 presents an estimation result (an inspection result) of estimating a defect incorporated into an actual mask will be described.

Also, the defect inspection device according to the third embodiment is provided in place of the defect inspection device 400 in the configuration of the mask defect inspection system 1 shown in FIG. 1. In other words, a configuration of a mask defect inspection system including the defect inspection device according to the third embodiment is a configuration in which the defect inspection device 400 in the configuration of the mask defect inspection system 1 including the defect inspection device 400 according to the first embodiment shown in FIG. 1 is replaced with the defect inspection device according to the third embodiment. In the following description, the mask defect inspection system including the defect inspection device according to the third embodiment is referred to as a "mask defect inspection system 3".

Also, the constituent elements provided in the defect inspection device according to the third embodiment include constituent elements similar to those provided in the defect inspection device 400 according to the first embodiment. Accordingly, in the following description, the same reference signs are given to constituent elements similar to those of the defect inspection device 400 according to the first embodiment among constituent elements of the defect inspection device according to the third embodiment and detailed description of the constituent elements will be omitted.

Figure 10:
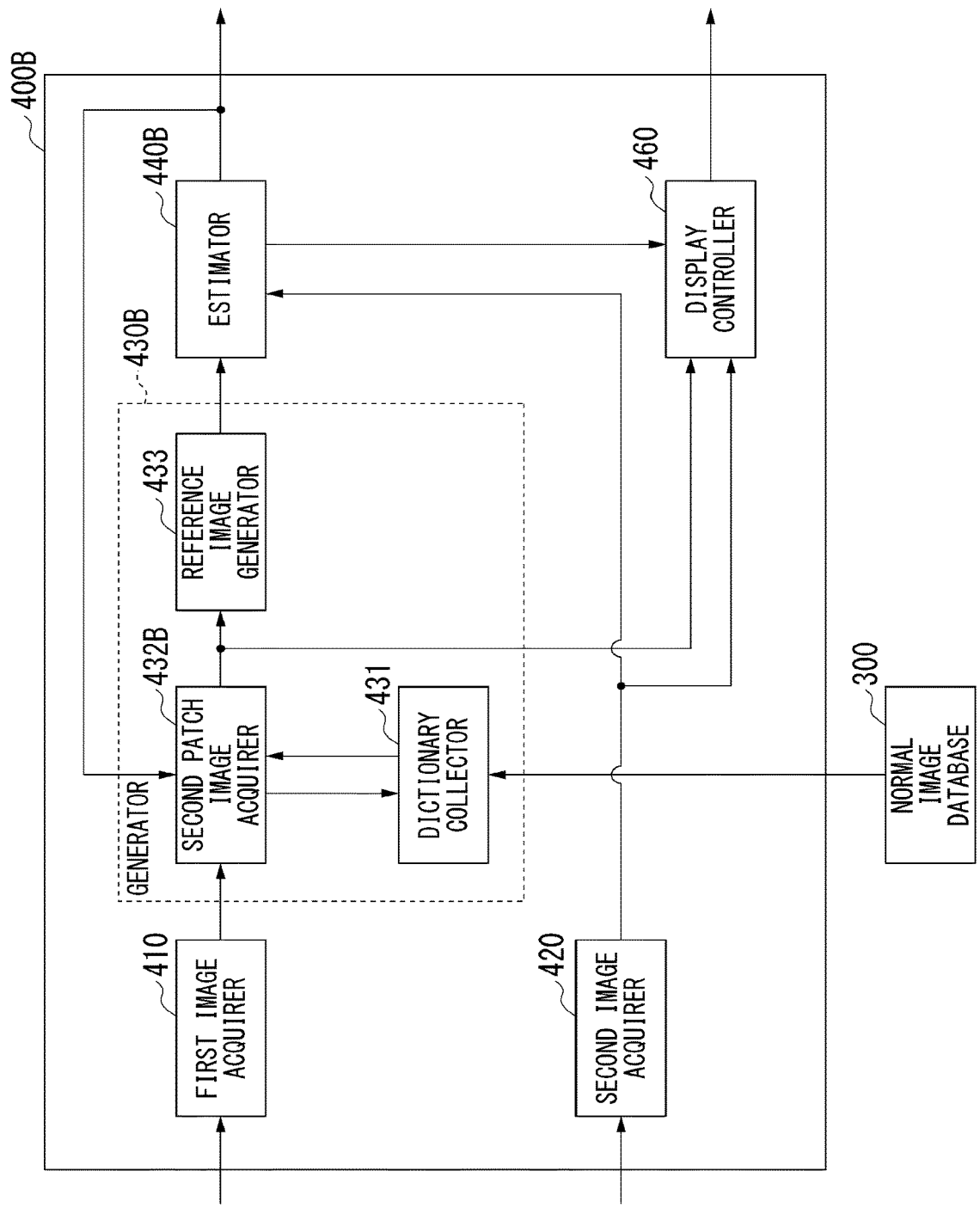
FIG. 10 is a block diagram showing an example of a configuration of a defect inspection device according to a third embodiment.

FIG. 10 is a block diagram showing an example of the configuration of the defect inspection device according to the third embodiment. A defect inspection device 400B includes the first image acquirer 410, the second image acquirer 420, a generator 430B, an estimator 440B, and a display controller 460. Also, the generator 430B includes the dictionary collector 431, a second patch image acquirer 432B, and the reference image generator 433. Also, in the following description, as in the first embodiment, it is assumed that index data is a design image and correct data is a mask-photographed image.

Similar to the generator 430 provided in the defect inspection device 400 according to the first embodiment, the generator 430B generates a simulated image (a reference image) obtained by reproducing a second image acquired by the second image acquirer 420 (captured by the mask photographing device 200) from a first image output by the first image acquirer 410 with reference to a set of images registered in the normal image database 300 and outputs the generated reference image to the estimator 440B. Also, the generator 430B acquires a result of comparing the reference image with the second image output from the estimator 440B, i.e., information of a position (a pixel position) where the circuit pattern is different between the reference image and the second image, and outputs the second patch image used to generate the reference image to the display controller 460.

Similar to the second patch image acquirer 432 provided in the generator 430 of the defect inspection device 400 according to the first embodiment, the second patch image acquirer 432B acquires a second patch image corresponding to a first image output by the first image acquirer 410 from the dictionary collector 431 and outputs the acquired second patch image to the reference image generator 433. Also, the second patch image acquirer 432B acquires a second patch image acquired with respect to a position represented by information of a position (a pixel position) where a circuit pattern is different between the reference image and the second image output by the estimator 440B from the dictionary collector 431 again and outputs the acquired second patch image to the display controller 460. At this time, a process in which the second patch image acquirer 432B acquires the second patch image from the dictionary collector 431 again can be considered to be similar to a process in which the above-described second patch image acquirer 432 acquires the second patch image from the dictionary collector 431. That is, the second patch image acquirer 432B sets a position (a pixel position) where a circuit pattern is different between the reference image and the second image output by the estimator 440B as the sampling point and acquires a second patch image associated with an extracted first patch image as a part of a patch image pair again.

Also, when information of a first patch image extracted to generate the reference image or a second patch image associated with the first patch image as a part of a patch image pair is retained, the second patch image acquirer 432B may acquire the second patch image of a position (a pixel position) where a circuit pattern is different between the reference image and the second image output by the estimator 440B again on the basis of the retained information and output the acquired second patch image to the display controller 460. Also, when the second patch image output to the reference image generator 433 is retained, the second patch image acquirer 432B may output the second patch image of a position (a pixel position) where a circuit pattern is different between the reference image and the second image output by the estimator 440B from among the retained second patch images to the display controller 460.

Similar to the estimator 440 provided in the defect inspection device 400 according to the first embodiment, the estimator 440B detects a different portion between circuit patterns copied in the reference image and the second image by comparing the reference image output by the generator 430B with the second image output by the second image acquirer 420 and estimates a defect in the circuit pattern incorporated when the mask is created. Also, when a portion where the circuit pattern is different between the reference image and the second image has been detected, the estimator 440B outputs information indicating a degree of matching between the calculated reference image and the second image to the display controller 460.

The display controller 460 causes the display device 500 to display the result of comparing the reference image with the second image in the estimator 440B. For example, when the estimator 440B estimates that no defect is incorporated into the circuit pattern formed on the actual mask, the display controller 460 outputs a message for providing a notification of the estimation result (the inspection result) to the display device 500 and causes the display device 500 to display the message. Also, for example, when the estimator 440B has detected a portion where the circuit pattern is different between the reference image and the second image, the display controller 460 outputs an image for presenting a portion in which a circuit pattern is different between the reference image and the second image to the display device 500 and causes the display device 500 to display the image. At this time, the display controller 460 outputs information and an image for assisting in the checking (determination) of the estimation result (inspection result) in the estimator 440B to the display device 500 and causes the display device 500 to display the information and the image. For example, the display controller 460 acquires information of a position (a pixel position) where the circuit pattern is different between the reference image and the second image estimated by the estimator 440B and causes the display device 500 to display an image obtained by superimposing a marker indicating the acquired position on the second image output by the second image acquirer 420 or an image obtained by enlarging an area having a predetermined size including the acquired position (for example, an area having the same size as the first patch image or the second patch image). Also, for example, the display controller 460 causes the display device 500 to display information indicating a degree of matching between the reference image and the second image output by the estimator 440B.

Figure 11:
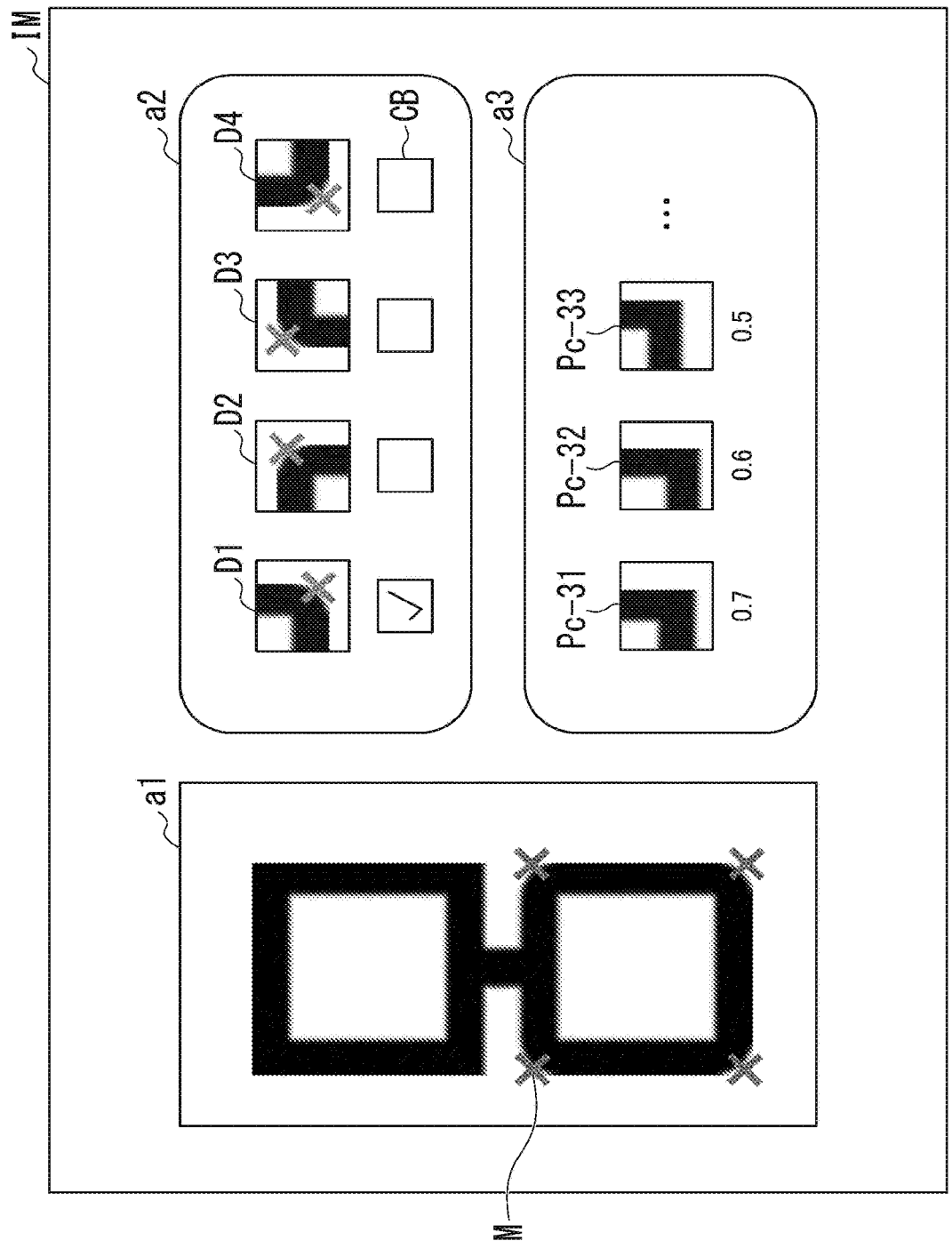
FIG. 11 is a diagram showing an example of an image displayed on a display device by a display controller.

FIG. 11 is a diagram showing an example of an image displayed on the display device 500 by the display controller 460. In FIG. 11, an example of an image IM in which the second image output by the second image acquirer 420 is displayed in a left area a1 and a marker M (an "X" mark in FIG. 11) indicating each position where the estimator 440B estimates that there is a defect in the circuit pattern is further superimposed and displayed is shown. Also, the marker M is not limited to the shape shown in FIG. 11 (the "X" mark) and may have any shape or color. Also, as for the shape and color of the marker M, a plurality of types of markers may be displayed in accordance with a shape of the circuit pattern estimated to be defective. For example, the shape or color of the marker M may be different depending on whether a position where a defect is estimated to be present is a straight line portion of a wiring circuit pattern or a bent portion of a wiring circuit pattern.

Also, an example in which an image obtained by enlarging an area of a predetermined size including each marker M within the area a1 is displayed in an upper right area a2 is shown in the image IM shown in FIG. 11. More specifically, because four positions where a defect is estimated to be present in the area a1 are displayed in the image IM shown in FIG. 11, four enlarged images (defect position images D1 to D4) is displayed in the area a2. Furthermore, an example in which check boxes CB corresponding to the respective defect position images D are displayed together in the area a2 is shown in the image IM shown in FIG. 11. For example, a person (a user) who executes mask defect inspection can cause information for checking (determining) a defect estimation result (inspection result) at the position of the selected defect position image D to be displayed by selecting any check box CR within the area a2. Also, the information displayed in correspondence with each defect position image D in the area a2 is not limited to the check box CB shown in FIG. 11. For example, information indicating the degree of matching between the reference image and the second image output by the estimator 440B may be displayed in association with each defect position image D.

Also, an example in which an image and information for checking (determining) the defect estimation result at the position of the defect position image D1 selected within the area a2 are displayed in a lower right area a3 is shown in the image IM shown in FIG. 11. More specifically, respective second patch images (second patch images Pc-31 to Pc-33) used when the reference image of the position of the selected defect position image D1 is generated and information of similarities to a first image associated with the respective second patch images are displayed within the area a3 in the image 1M shown in FIG. 11. Thereby, for example, the person (the user) who executes mask defect inspection can check whether or not the second patch image used when the reference image of the position of the selected defect position image D1 is generated is a second patch image associated with the first patch image having a lower similarity to the first image. Also, although the similarities are arranged in descending order to display the respective second patch images in the example of the area a3 of the image 1M shown in FIG. 11, for example, the similarities may be arranged in ascending order to display the respective second patch images. Also, the order in which similarities are arranged may be based on the time when a set of images (index data and correct data) has been stored in the normal image database 300 as in an example in which a second patch image cut out from a latest set of images is first arranged or the like. Also, instead of the similarity information represented in the example of the area a3 of the image IM shown in FIG. 11, for example, information indicating the degree of matching between the reference image and the second image output by the estimator 440B may be displayed in correspondence with each second patch image.

In this manner, the display controller 460 outputs information and images for assisting the person (the user) who executes mask defect inspection to check (determine) the estimation result (inspection result) in the estimator 440B to the display device 500 and causes the display device 500 to display the information and the images. Also, the information and the images displayed on the display device 500 by the display controller 460 are not limited to the above-described example. For example, the display controller 460 may cause the display device 500 to display statistics of similarities or may cause the display device 500 to display an average value, a variance value, a maximum value, a minimum value, or the like of similarities of all second patch images used for generating a reference image. Also, for example, the display controller 460 may also cause the display device 500 to display identification information (ID) of a current mask subjected to the mask defect inspection or the like. At this time, the display controller 460 appropriately acquires information and images to be displayed on the display device 500 from the corresponding constituent elements. Also, the display controller 460 may cause a terminal device such as a tablet terminal or the liked used by the user to display information and images by transmitting the information and the images through, for example, wireless communication or the like, in addition to the display on the display device, instead of causing the display device 500 to display the above-described information and images.

According to the above-described configuration and process, for example, the defect inspection device 400B presents information and images for assisting in the checking (determination) of an estimation result (an inspection result) in the estimator 440B to the person (the user) who executes mask defect inspection by causing the display device 500 to display the information and the images. Thereby, the user can easily check (determine) the estimation result (the inspection result) of the estimator 440B such as whether a defect estimated by the estimator 440B is a true defect incorporated into the actual mask or a fake defect due to a reference image with low reproducibility generated by combining second patch images associated with first patch images having a low similarity to a first image.

As described above, also in the mask defect inspection system 3 including the defect inspection device 400B according to the third embodiment, as in the mask defect inspection system 1 including the defect inspection device 400 according to the first embodiment, the defect inspection device 400B generates a reference image obtained by reproducing a second image from a first image that does not have a defect in the circuit pattern output by the design data acquisition device 100 and estimates a portion of a defect incorporated into a circuit pattern formed on the actual mask by comparing the generated reference image with the second image actually captured by the mask photographing device 200. Also, the mask defect inspection system 3 including the defect inspection device 400B according to the third embodiment causes the display device 500 to display a result of estimating a defect in a circuit pattern in the defect inspection device 400B or information and images for assisting, for example, the person (the user) who executes mask defect inspection, to check (determine) a result of estimating a defect in a circuit pattern in the defect inspection device 400B. Thereby, also in the mask defect inspection system 3 including the defect inspection device 400B according to the third embodiment, as in the mask defect inspection system 1 including the defect inspection device 400 according to the first embodiment, it is possible to easily inspect a defect incorporated into a circuit pattern with high accuracy when the mask is actually created.

As described above, the defect inspection device 400B may further include the display controller 460 configured to cause the display device 500 to display an area (for example, a defective position image D) of a predetermined size including a position where a circuit pattern of a mask of the inspection target estimated to be defective by the estimator 440B is different (a position of a pixel corresponding to a defective position).

Also, as described above, in the defect inspection device 400B, the estimator 440B may calculate a degree of matching between the reference image and the second image and estimates the pixel corresponding to the defective position on the mask of the inspection target photographed in the second image on the basis of the degree of matching, and the display controller 460 may cause information indicating the degree of matching calculated by the estimator 440B to be displayed in association with an area of the predetermined size including a position where a circuit pattern of a mask of the inspection target estimated to be defective is different (a position of a pixel corresponding to a defective position).

Fourth Embodiment

Hereinafter, a defect inspection device according to a fourth embodiment will be described. In the defect inspection devices according to the first to third embodiments, a reference image is generated on the basis of a first patch image and a second patch image respectively cut out from index data and correct data included in a set of images categorized and registered in the normal image database 300. However, a method in which the defect inspection device generates the reference image is not limited to a generation method based on the first patch image and the second patch image shown in the defect inspection devices according to the first to third embodiments. For example, a method of generating a reference image using a function based on index data and correct data included in a set of images categorized and registered in the normal image database 300 is also conceivable. In the defect inspection device according to the fourth embodiment, a configuration using a function when a reference image is generated will be described.

In the following description, a defect inspection device configured to generate a reference image using a deep neural network (DNN) algorithm as an example of a configuration using a function when a reference image is generated will be described as a defect inspection device according to the fourth embodiment. A DNN is a generic name for a network in which several layers are cascaded. The DNN includes respective layers for different types of operations such as a convolution layer for performing a convolution operation, a deconvolution layer for performing a deconvolution operation, an activation layer for performing a nonlinear operation using an activation function, a pooling layer for thinning out data, an unpooling layer for performing reverse pooling, and a full coupling layer for performing many other product-sum operations.

Also, the defect inspection device according to the fourth embodiment is provided in place of the defect inspection device 400 in the configuration of the mask defect inspection system 1 shown in FIG. 1. In other words, a configuration of a mask defect inspection system including the defect inspection device according to the fourth embodiment is a configuration in which the defect inspection device 400 in the configuration of the mask defect inspection system 1 including the defect inspection device 400 according to the first embodiment shown in FIG. 1 is replaced with the defect inspection device according to the fourth embodiment. In the following description, the mask defect inspection system including the defect inspection device according to the fourth embodiment is referred to as a "mask defect inspection system 4".

Also, the constituent elements provided in the defect inspection device according to the fourth embodiment include constituent elements similar to those provided in the defect inspection device 400 according to the first embodiment. Accordingly, in the following description, the same reference signs are given to constituent elements similar to those of the defect inspection device 400 according to the first embodiment among constituent elements of the defect inspection device according to the fourth embodiment and a detailed description of the constituent elements will be omitted.

Figure 12:
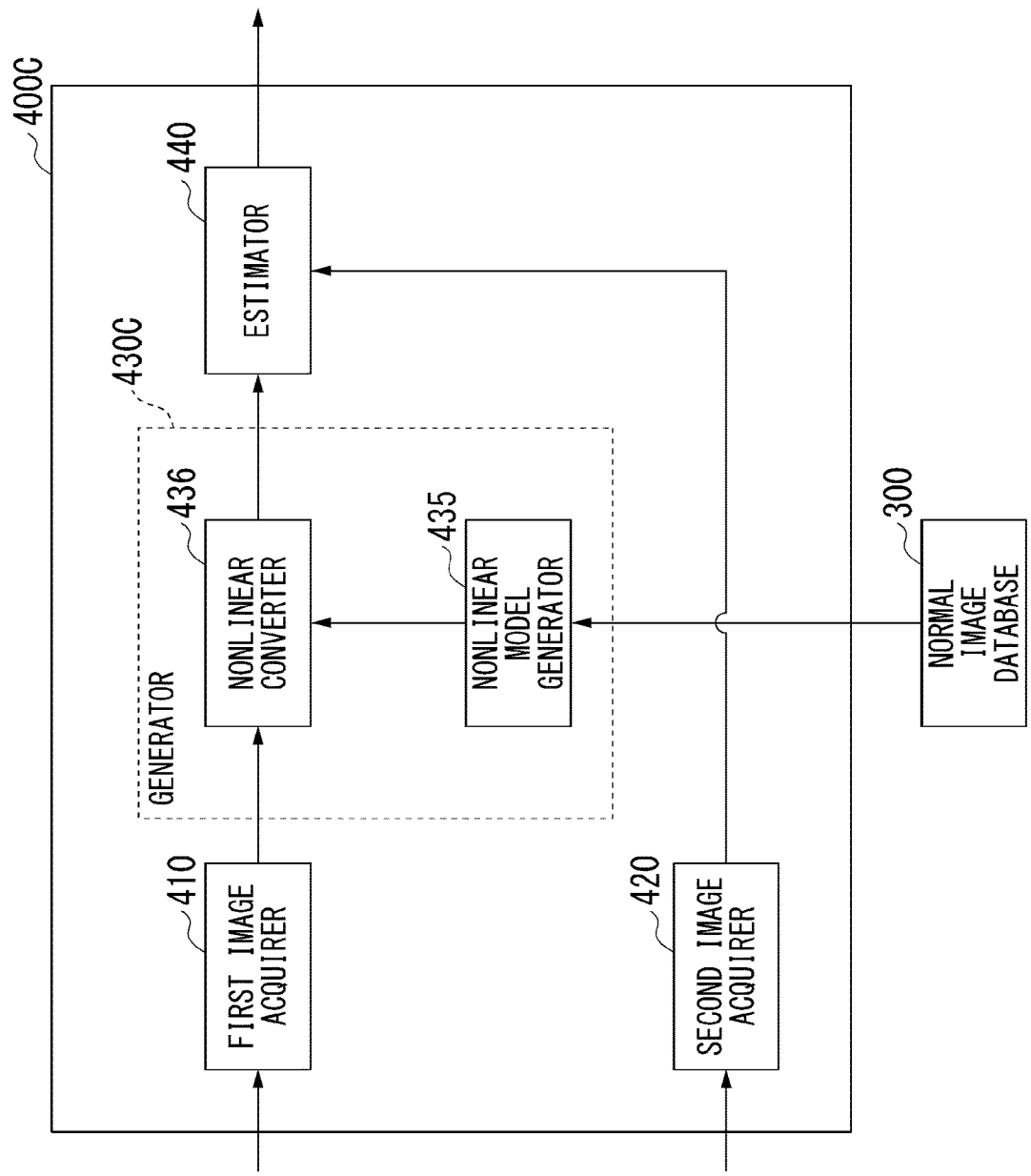
FIG. 12 is a block diagram showing an example of a configuration of a defect inspection device according to a fourth embodiment.

FIG. 12 is a block diagram showing an example of a configuration of the defect inspection device according to the fourth embodiment. A defect inspection device 400C includes the first image acquirer 410, the second image acquirer 420, a generator 430C, and the estimator 440. Also, the generator 430C includes a nonlinear model generator 435 and a nonlinear converter 436. Also in the following description, as in the first embodiment, it is assumed that index data is a design image and correct data is a mask-photographed image.

The generator 430C performs learning using the DNN algorithm on the basis of a set of images registered in the normal image database 300 and generates a simulated image (a reference image) obtained by reproducing a second image acquired by the second image acquirer 420 (captured by the mask photographing device 200) from a first image output by the first image acquirer 410. The generator 430C outputs the generated reference image to the estimator 440.

The nonlinear model generator 435 acquires some or all sets of index data and correct data which are design patterns and resolutions corresponding to a second image of a target for allowing the defect inspection device 400C to inspect a defect in a circuit pattern from among sets of index data and correct data categorized and registered in the normal image database 300. Then, the nonlinear model generator 435 learns a nonlinear conversion model on the basis of the acquired sets of index data and the acquired correct data. Learning in the nonlinear model generator 435 is adjusting a parameter that defines an operation of each layer so that an output image when the acquired index data is input to the DNN approaches correct data associated with the input index data. More specifically, a loss function representing a difference between the output image from the DNN and the correct data is defined and each parameter is updated so that a value of the loss function becomes small. As a parameter update method in the DNN, for example, there is a back propagation method. An example of the loss function is a square error between two images or the like. Also, as a loss function, regularization for providing an effect of decreasing a parameter to a small value may be performed in addition to a term for measuring a difference between two images. A nonlinear conversion model is a set of parameters necessary for a nonlinear operation (a set of parameters necessary for an operation of each layer in the DNN). For example, in the case of a convolution layer, it is a numerical value that defines a convolution kernel. The nonlinear model generator 435 generates a nonlinear conversion model for reproducing correct data associated with the index data according to learning on the basis of the acquired index data as described above. The nonlinear model generator 435 outputs the generated (learned) nonlinear conversion model to the nonlinear converter 436.

The nonlinear converter 436 generates a reference image obtained by reproducing a second image acquired by the second image acquirer 420 (a second image captured by the mask photographing device 200) from a first image by performing nonlinear conversion on the first image output by the first image acquirer 410 on the basis of the nonlinear conversion model output by the nonlinear model generator 435. In the DNN in the nonlinear converter 436, an operation is performed on the input first image by respective layers of a structure of a network connected in series and an output of the final layer becomes a reference image. As an example of the structure of this network, there is, for example, an auto encoder including two processes of encoding and decoding. In the encoding, for example, a dimension of data output from the convolution layer and the activation layer is reduced by the pooling layer. Also, in the encoding, the dimension of the output from the convolution layer may be compressed by sparsely performing a convolution operation on the data. In this case, in the encoding, dimensions of the input image (i.e., the first image) are compressed by connecting these layers in series. On the other hand, in the decoding, the deconvolution operation process is performed by the deconvolution layer and a data dimension is expanded to an image size of the reference image to be generated. In the decoding, the dimension of data may be expanded using the unpooling layer.

According to the above-described configuration and process, in the defect inspection device 400C, the generator 430C generates (learns) a nonlinear conversion model for reproducing a second image captured by the mask photographing device 200 on the basis of a set of images registered in the normal image database 300, generates a reference image obtained by reproducing the second image from a first image output by the first image acquirer 410 (a first image that does not have a defect in the circuit pattern created and output by the design data acquisition device 100) on the basis of the generated (learned) nonlinear conversion model, and outputs the reference image to the estimator 440. Thereby, also in the defect inspection device 400C, the estimator 440 can estimate a portion where a circuit pattern is different between the reference image and the second image as a portion where a defect is incorporated into the circuit pattern formed on the actual mask by comparing the reference image output by the generator 430C with the second image output by the second image acquirer 420.

As described above, also in the mask defect inspection system 4 including the defect inspection device 400C according to the fourth embodiment, as in the mask defect inspection system 1 including the defect inspection device 400 according to the first embodiment, the defect inspection device 400C generates a reference image obtained by reproducing a second image from a first image that does not have a defect in the circuit pattern output by the design data acquisition device 100 and estimates a portion of a defect incorporated into a circuit pattern formed on the actual mask by comparing the generated reference image with the second image actually captured by the mask photographing device 200. Thereby, also in the mask defect inspection system 4 including the defect inspection device 400C according to the fourth embodiment, as in the mask defect inspection system 1 including the defect inspection device 400 according to the first embodiment, it is possible to easily inspect a defect incorporated into a circuit pattern with high accuracy when the mask is actually created.

Also, a configuration in which a set of images in which index data (a design image) and correct data (a mask-photographed image) determined not to be defective in the previous mask defect inspection are associated is registered in the normal image database 300 constituting the mask defect inspection system 4 has been described above. In the fourth embodiment, a configuration in which a nonlinear conversion model is generated (learned) on the basis of a set of images registered in the normal image database 300 within the generator 430C (more specifically, the nonlinear model generator 435) provided in the defect inspection device 400C constituting the mask defect inspection system 4 and a reference image is subsequently generated has been described. However, a nonlinear conversion model to be used for generating a reference image for use in defect inspection in the mask defect inspection system 4 is not limited to a configuration in which the nonlinear conversion model is generated (learned) by the nonlinear model generator 435 shown in the fourth embodiment. For example, a configuration in which a nonlinear conversion model is registered and retained in the normal image database 300 in addition to or instead of a set of images in which index data and correct data are associated may be adopted. This nonlinear conversion model may be generated (learned) by the nonlinear model generator 435 or may be generated (learned) by other constituent elements (not shown). In this case, the generator 430C does not include the nonlinear model generator 435 and may have a configuration in which the nonlinear converter 436 acquires a nonlinear conversion model generated (learned) on the basis of a set of images of a design data and resolution corresponding to a second image from among nonlinear conversion models retained in the normal image database 300, performs nonlinear conversion on a first image on the basis of the acquired nonlinear conversion model, and generates a reference image.

As described above, in the defect inspection device 400C, the correct data may be a nonlinear conversion model for reproducing the second image according to nonlinear conversion from the third image constituting the index data, and the generator 430C may include the nonlinear converter 436 configured to generate the reference image obtained by reproducing the second image from the first image by performing nonlinear conversion on the first image on the basis of the nonlinear conversion model. Also, as described above, in the defect inspection device 400C, the generator 430C may include the nonlinear model generator 435 configured to generate a nonlinear conversion model for reproducing the correct data according to nonlinear conversion on the basis of the third image constituting the index data; and the nonlinear converter 436 configured to generate the reference image obtained by reproducing the second image from the first image by performing nonlinear conversion on the first image on the basis of the nonlinear conversion model.

Fifth Embodiment

Hereinafter, a defect inspection device according to a fifth embodiment will be described. The defect inspection device 400C according to the fourth embodiment generates a reference image on the basis of a nonlinear conversion model generated (learned) by the nonlinear model generator 435 provided in the generator 430C of the defect inspection device 400C instead of generating a reference image on the basis of a pair of patch images (first and second patch images) cut out from a set of images registered in the normal image database 300 and collected as a dictionary by the dictionary collector 431 provided in the generator 430 of the defect inspection device 400 according to the first embodiment. That is, the nonlinear conversion model used when the reference image is generated in the defect inspection device 400C according to the fourth embodiment is also generated (learned) on the basis of each of index data and correct data included in a set of images registered in the normal image database 300. Thus, also in the defect inspection device 400C according to the fourth embodiment, as in the defect inspection device 400 according to the first embodiment, there is concern that the reproducibility of a reference image including a new circuit pattern is lowered when the new circuit pattern which is not included in index data registered in the normal image database 300 is copied in a second image output by the mask photographing device 200. This is because a portion of the new circuit pattern is not learned in the nonlinear conversion model. Then, also in the defect inspection device 400C according to the fourth embodiment, as in the defect inspection device 400 according to the first embodiment, there is concern that a possibility that the estimator 440 will erroneously estimate that a portion of a new circuit pattern is defective is increased even when there is no defect in the portion of the new circuit pattern in the actual mask. Thus, the defect inspection device according to the fifth embodiment has a configuration in which a nonlinear conversion model corresponding to a new circuit pattern is further learned to improve the reproducibility of a reference image to be subsequently generated. In other words, in the defect inspection device according to the fifth embodiment, a configuration in which a nonlinear conversion model corresponding to a new circuit pattern is further learned is added to the defect inspection device 400C according to the fourth embodiment on the basis of a concept similar to that of the defect inspection device 400A according to the second embodiment obtained by adding a configuration in which a patch image pair corresponding to a new circuit pattern is added to or updated in the dictionary collector 431 to the defect inspection device 400 according to the first embodiment.

Also, a defect inspection device according to the fifth embodiment is provided instead of the defect inspection device 400 in the configuration of the mask defect inspection system 1 shown in FIG. 1. In other words, a configuration of a mask defect inspection system including the defect inspection device according to the fifth embodiment is a configuration in which the defect inspection device 400 in the configuration of the mask defect inspection system 1 including the defect inspection device 400 according to the first embodiment shown in FIG. 1 is replaced with the defect inspection device according to the fifth embodiment. In the following description, the mask defect inspection system including the defect inspection device according to the fifth embodiment is referred to as a "mask defect inspection system 5".

Also, the constituent elements provided in the defect inspection device according to the fifth embodiment include constituent elements similar to those provided in the defect inspection device 400A according to the second embodiment and the defect inspection device 400C according to the fourth embodiment. Accordingly, in the following description, the same reference signs are given to constituent elements similar to those of the defect inspection device 400A according to the second embodiment and the defect inspection device 400C according to the fourth embodiment among constituent elements of the defect inspection device according to the fifth embodiment and a detailed description of the constituent elements will be omitted.

Figure 13:
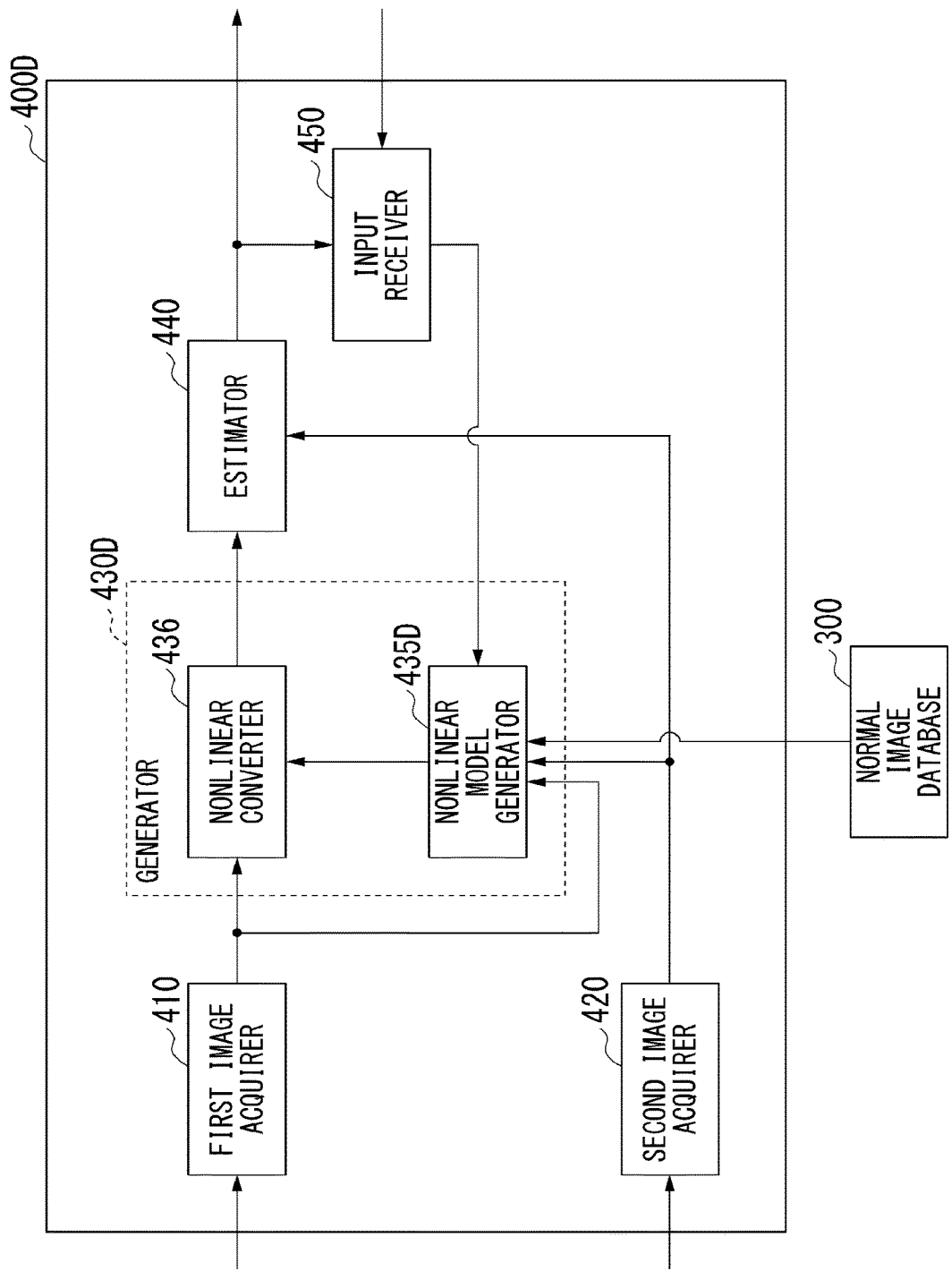
FIG. 13 is a block diagram showing an example of a configuration of a defect inspection device according to a fifth embodiment.

FIG. 13 is a block diagram showing an example of a configuration of the defect inspection device according to the fifth embodiment. A defect inspection device 400D includes the first image acquirer 410, the second image acquirer 420, a generator 430D, the estimator 440, and the input receiver 450. Also, the generator 430D includes a nonlinear model generator 435D and the nonlinear converter 436. Also, in the following description, as in the fourth embodiment, it is assumed that index data is a design image and correct data is a mask-photographed image.

For example, when an instruction for updating the nonlinear conversion model is received from a person (a user) who executes mask defect inspection, the input receiver 450 acquires a result of comparing a reference image output by the estimator 440 with a second image, i.e., information of a position (a pixel position) where a circuit pattern is different between the reference image and the second image, and outputs the acquired information of the position to the generator 430D.

Similar to the generator 430C provided in the defect inspection device 400C according to the fourth embodiment, the generator 430D performs learning using a DNN algorithm on the basis of a set of images registered in the normal image database 300, generates a simulated image (a reference image) obtained by reproducing a second image acquired by the second image acquirer 420 (captured by the mask photographing device 200) from a first image output by the first image acquirer 410, and outputs the generated reference image to the estimator 440. Also, the generator 430D further learns a nonlinear conversion model on the basis of information of a position where a circuit pattern output by the input receiver 450 receiving an input of an instruction for updating the nonlinear conversion model is different.

Similar to the nonlinear model generator 435 provided in the generator 430C of the defect inspection device 400C according to the fourth embodiment, the nonlinear model generator 435D generates (learns) a nonlinear conversion model on the basis of a set of images registered in the normal image database 300 and outputs the generated (learned) nonlinear conversion model to the nonlinear converter 436. Also, current first and second images subjected to mask defect inspection in the defect inspection device 400D are acquired on the basis of information of a position where the circuit pattern output by the input receiver 450 is different and a nonlinear conversion model is further learned on the basis of the acquired current first and second images and is updated to a new nonlinear conversion model. As a method of updating a nonlinear conversion model in the nonlinear model generator 435D, for example, there is a model update method called fine tuning or the like in a DNN. In this update method based on fine tuning, it is possible to update only some parameters of the network, i.e., it is possible to update a parameter of a portion of a new circuit pattern erroneously estimated to be defective on the basis of acquired current first and second images. Also, a back propagation method or the like may be used as the method of updating a nonlinear conversion model in the nonlinear model generator 435D. Also, the nonlinear model generator 435D may readjust some or all of parameters of the DNN by temporarily registering the acquired current first and second images in the normal image database 300. For example, the nonlinear model generator 435D may relearn the nonlinear conversion model including the acquired current first and second images. The nonlinear model generator 435D outputs a new nonlinear conversion model which has been generated (learned) to the nonlinear converter 436. Thereby, the nonlinear converter 436 can generate a reference image reproduced by also including a new circuit pattern in a second image acquired by the second image acquirer 420 (a second image captured by the mask photographing device 200) from a first image on the basis of a nonlinear conversion model output by the nonlinear model generator 435D.

According to the above-described configuration and process, the defect inspection device 400D generates (updates) a nonlinear conversion model obtained by further learning a portion of a new circuit pattern which is not defective in the actual mask but is erroneously estimated to be defective in the circuit pattern by the estimator 440. Thereby, in the subsequent mask defect inspection in the mask defect inspection system 5, the defect inspection device 400D generates a reference image based on a new nonlinear conversion model. In other words, the reproducibility of the reference image subsequently generated in the defect inspection device 400D is improved. Thereby, the mask defect inspection system 5 can easily and accurately inspect a defect incorporated into a circuit pattern formed on the mask when the mask is actually created.

As described above, also in the mask defect inspection system 5 including the defect inspection device 400D according to the fifth embodiment, as in the mask defect inspection system 4 including the defect inspection device 400C according to the fourth embodiment, the defect inspection device 400D generates a reference image obtained by reproducing a second image from a first image that does not have a defect in a circuit pattern output by the design data acquisition device 100 and estimates a portion of a defect incorporated into a circuit pattern formed on the actual mask by comparing the generated reference image with the second image actually captured by the mask photographing device 200. Thereby, also in the mask defect inspection system 5 including the defect inspection device 400D according to the fifth embodiment, as in the mask defect inspection system 4 including the defect inspection device 400C according to the fourth embodiment, it is possible to easily inspect a defect incorporated into a circuit pattern with high accuracy when the mask is actually created.

Moreover, in the mask defect inspection system 5 including the defect inspection device 400D according to the fifth embodiment, for example, a nonlinear conversion model obtained by further learning a portion of a new circuit pattern is generated (updated) in accordance with an instruction from a person (a user) who executes mask defect inspection when the defect inspection device 400D erroneously estimates that a portion which does not have a defect in an actual mask has a defect. Thereby, in the mask defect inspection system 5 including the defect inspection device 400D according to the fifth embodiment, the reproducibility of the reference image to be subsequently generated is improved and a defect incorporated into the circuit pattern when the mask is actually created can be inspected with higher accuracy.

Also, a case in which a nonlinear conversion model is generated (updated) when a portion which does not have a defect in an actual mask is erroneously estimated to have a defect has been described. However, the update of the nonlinear conversion model is not limited to the case in which a portion which does not have a defect in an actual mask is erroneously estimated to have a defect. For example, even when it is determined that a result of current mask defect inspection in the defect inspection device 400D indicates that there is no defect in the actual mask, the nonlinear conversion model may be further learned on the basis of current first and second images and may be updated to a new nonlinear conversion model. In this case, it is possible to generate (update) a nonlinear conversion model learned as a whole on the basis of current first and second images by assuming that all portions of the current first and second images determined not to have a defect in the actual mask are defective.

Also, a case in which the nonlinear model generator 435D further learns (updates) the nonlinear conversion model in the defect inspection device 400D has been described above. However, the defect inspection device 400D is not limited to a configuration in which a new nonlinear conversion model is further learned (updated) by the nonlinear model generator 435D. For example, the defect inspection device 400D may be configured to also register a new nonlinear conversion model in the normal image database 300 when the nonlinear model generator 435D has further learned (updated) the new nonlinear conversion model. Also, for example, when the normal image database 300 has a configuration in which a nonlinear conversion model is also registered and retained, the defect inspection device 400D may have a configuration in which the nonlinear conversion model further learned (updated) by the nonlinear model generator 435D is replaced (updated) with a nonlinear conversion model registered in the normal image database 300.

As described above, in the defect inspection device 400D, the nonlinear model generator 435D acquires each of a position of a pixel corresponding to a defective position on the inspection target photographed in the second image erroneously estimated to be defective by the estimator 440, the first image, and the second image and generates and adds the nonlinear conversion model for reproducing the acquired second image according to nonlinear conversion on the basis of the acquired first image in accordance with a received operation of adding the nonlinear conversion model.

Also, for example, a configuration in which an estimation result of estimating a defect incorporated into an actual mask in the estimator 440 (an inspection result) is presented to a person (a user) who executes mask defect inspection has not been described in the defect inspection device 400C according to the fourth embodiment and the defect inspection device 400D according to the fifth embodiment. However, a configuration in which an estimation result of estimating a defect incorporated into an actual mask in the estimator 440 (an inspection result) is presented in the defect inspection device 400C according to the fourth embodiment and the defect inspection device 400D according to the fifth embodiment can be easily understood in consideration of the defect inspection device 400B according to the third embodiment similarly. Accordingly, detailed description of a configuration in which an estimation result of estimating a defect incorporated into an actual mask in the estimator 440 (an inspection result) is presented in the defect inspection device 400C according to the fourth embodiment and the defect inspection device 400D according to the fifth embodiment is omitted.

As described above, the defect inspection device of each embodiment generates a reference image obtained by reproducing a second image on the basis of a first image (a design image) and a second image (a mask-photographed image) determined not to have a defect in previous mask defect inspection and estimates a portion where a defect is incorporated into a circuit pattern formed on the actual mask by comparing the generated reference image with the second image. Thereby, in the mask defect inspection system 1 in which the defect inspection device according to each embodiment is adopted, it is possible to easily and accurately inspect a defect incorporated into a circuit pattern formed on the mask when the mask is actually created.

Also, a case in which the defect inspection device is adopted in a mask defect inspection system for inspecting whether or not a defect is incorporated into an original mask on which a circuit pattern of a semiconductor device is formed has been described in each of the above-described embodiments. However, various systems other than the mask defect inspection system are conceivable as a system that detects a defect by comparing a reference image with an actually captured image, i.e., a system in which the defect inspection device is adopted. Also, a case in which each image handled by the defect inspection device is a two-dimensional image has been described in each of the above-described embodiments. However, the image handled by the defect inspection device is not limited to a two-dimensional image, and may be, for example, a three-dimensional image. For example, the first image may be a three-dimensional image created in architectural design or the like. Then, the defect inspection device may be adopted in a system for generating a reference image by reproducing a second image captured at a construction site from the three-dimensional image and checking a state of a building during construction by comparing the reference image with the second image that has been actually captured. Also, a case in which an inspection target in the defect inspection device is a circuit pattern formed on a mask has been described in each of the above-described embodiments. However, the inspection target in the defect inspection device is not limited to one related to a structure such as a circuit pattern and may be related to anything other than the structure such as a material of an object and a color of a surface.

According to at least one embodiment described above, it is possible to perform a defect inspection with high accuracy by providing a first image acquirer (410) configured to acquire a first image (a design image) of an inspection target created in a first creation method (a method of a predetermined process of creating the first image (the design image) on the basis of design data); a second image acquirer (420) configured to acquire a second image obtained by photographing the inspection target; a generator (430) configured to extract index data similar to the acquired first image with reference to a database (300) in which a third image created in the first creation method or the index data that is a feature quantity obtained by the third image is associated with correct data that is used as a comparison target of the index data and is an image determined not to be defective in previous inspection, acquire the correct data associated with the extracted index data in the database (300), and generate a reference image on the basis of the acquired correct data; and an estimator (440) configured to estimate a pixel corresponding to a defective position on the inspection target photographed in the second image by comparing the reference image with the second image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A defect inspection device comprising:
at least one memory storing instructions, and
at least one processor configured to execute the instructions to:
acquire a first image of an inspection target created in a first creation method;
acquire a second image obtained by photographing the inspection target;
extract index data similar to the acquired first image with reference to a database, the index data being a third image created in the first creation method or a feature quantity obtained by the third image, the database including the index data associated with correct data that is used as a comparison target of the index data and is an image determined not to be defective in previous inspection,
acquire the correct data associated with the extracted index data in the database,
generate a reference image on basis of the acquired correct data; and
estimate a pixel associated with a defective position on the inspection target photographed in the second image by comparing the reference image with the second image.

2. The defect inspection device according to claim 1,
wherein the index data is a first patch image obtained by cutting out an area of a predetermined size from the third image,
wherein the correct data is a second patch image obtained by cutting out an area of a size corresponding to the first patch image from the image determined not to be defective, and
wherein the at least one processor is configured to:
extract the first patch image having a high similarity to a cutout image obtained by cutting out an area of a size corresponding to the first patch image from the first image;
acquire the second patch image associated with the extracted first patch image; and
generate the reference image obtained by reproducing the second image from the first image on a basis of the acquired second patch image.

3. The defect inspection device according to claim 2,
wherein the at least one processor is configured to extract the first patch image having the high similarity to the cutout image on a basis of a square error in each of the cutout image and the first patch image or a normalized cross-correlation value.

4. The defect inspection device according to claim 2, wherein the at least one processor is configured to:
extract a plurality of first patch images having a similarity greater than or equal to a predetermined value to the cutout image:
acquire the second patch image associated with each first patch image that has been extracted; and
obtain a pixel value of a pixel constituting the reference image to be generated by averaging pixel values of pixels shown at a same position included in second patch images that have been acquired.

5. The defect inspection device according to claim 1, wherein the at least one processor is configured to:
collect patch image pairs in which a first patch image obtained by cutting out an area of a predetermined size from the third image constituting the index data is associated with a second patch image obtained by cutting out an area of a size corresponding to the first patch image from the image determined not to be defective constituting the correct data;
retain the collected patch image pairs as a dictionary;
extract a patch image pair including the first patch image having a high similarity to a cutout image obtained by cutting out an area of a size corresponding to the first patch image from the first image from among the patch image pairs collected;
acquire the second patch image associated in the extracted patch image pair; and
generate the reference image obtained by reproducing the second image from the first image on a basis of the acquired second patch image.

6. The defect inspection device according to claim 5, wherein the at least one processor is further configured to:
acquire a position of a pixel associated with a defective position on the inspection target photographed in the second image erroneously estimated to be defective, the first image, and the second image; and
add to the dictionary a patch image pair in which a first patch image is associated with a second patch image obtained by cutting out areas of the predetermined size including the position of the pixel erroneously estimated to be defective from the acquired first and second images in accordance with a received operation of adding a patch image pair.

7. The defect inspection device according to claim 1, wherein the correct data is a nonlinear conversion model for reproducing the second image by performing nonlinear conversion on the third image constituting the index data, and
wherein the at least one processor is configured to generate the reference image obtained by reproducing the second image from the first image by performing nonlinear conversion on the first image on a basis of the nonlinear conversion model.

8. The defect inspection device according to claim 1, wherein the at least one processor is configured to:
generate a nonlinear conversion model for reproducing the correct data according to nonlinear conversion on a basis of the third image constituting the index data; and
generate the reference image obtained by reproducing the second image from the first image by performing nonlinear conversion on the first image on a basis of the nonlinear conversion model.

9. The defect inspection device according to claim 8, wherein the at least one processor is configured to:
acquire each of a position of a pixel associated with a defective position on the inspection target photographed in the second image erroneously estimated to be defective, the first image, and the second image; and
generate and add the nonlinear conversion model for reproducing the second image according to nonlinear conversion on a basis of the first image in accordance with a received operation of adding the nonlinear conversion model.

10. The defect inspection device according to claim 1, wherein the at least one processor is further configured to cause a display device to display an area of a predetermined size including a pixel associated with a detective position on the inspection target estimated to be defective.

11. The defect inspection device according to claim 10, wherein the at least one processor is configured to:
calculate a degree of matching between the reference image and the second image;
estimate the pixel associated with the defective position on the inspection target estimated to be defective on a basis of the degree of matching; and
cause the display device to display information indicating the degree of matching calculated in association with an area of the predetermined size including the pixel associated with the defective position on the inspection target estimated to be defective.

12. The defect inspection device according to claim 1, wherein the at least one processor is configured to:
normalize a pixel value of a pixel constituting each of the reference image and the second image; and
estimate the pixel associated with the defective position on the inspection target photographed in the second image by comparing pixel values obtained by normalizing pixels of a same position.

13. The defect inspection device according to claim 1, wherein the at least one processor is configured to estimate a pixel for which a difference between pixel values of pixels of a same position in the reference image and the second image is greater than or equal to a predetermined threshold value as a defective pixel.

14. A defect inspection method using a computer comprising:
acquiring a first image of an inspection target created in a first creation method;
acquiring a second image obtained by photographing the inspection target;
extracting index data similar to the acquired first image with reference to a database, the index data being a third image created in the first creation method or a feature quantity obtained by the third image, the database including the index data associated with correct data that is used as a comparison target of the index data and is an image determined not to be defective in previous inspection;
acquiring the correct data associated with the extracted index data in the database;
generating a reference image on a basis of the acquired correct data; and
estimating a pixel associated with a defective position on the inspection target photographed in the second image by comparing the reference image with the second image.

15. A non-transitory computer-readable storage medium storing a program for causing a computer to:

acquire a first image of an inspection target created in a first creation method;

acquire a second image obtained by photographing the inspection target;

extract index data similar to the acquired first image with reference to a database, the index data being a third image created in the first creation method or a feature quantity obtained by the third image, the database including the index data associated with correct data that is used as a comparison target of the index data and is an image determined not to be defective in previous inspection;

acquire the correct data associated with the extracted index data in the database;

generate a reference image on a basis of the acquired correct data; and estimate a pixel associated with a defective position on the inspection target photographed in the second image by comparing the reference image with the second image.

* * * * *